(12) United States Patent
Evans et al.

(10) Patent No.: US 11,773,554 B2
(45) Date of Patent: Oct. 3, 2023

(54) EROSION PREVENTION

(71) Applicant: SHORE DEFENCE LIMITED, Worcester (GB)

(72) Inventors: Marcus Paul Evans, Worcester (GB); William Paul Evans, Worcester (GB)

(73) Assignee: SHORE DEFENCE LIMITED, Worcester (GB)

( * ) Notice: Subject to any disclaimer, the term of this patent is extended or adjusted under 35 U.S.C. 154(b) by 0 days.

(21) Appl. No.: 17/924,818

(22) PCT Filed: May 7, 2021

(86) PCT No.: PCT/GB2021/051111
§ 371 (c)(1),
(2) Date: Nov. 11, 2022

(87) PCT Pub. No.: WO2021/229205
PCT Pub. Date: Nov. 18, 2021

(65) Prior Publication Data
US 2023/0183933 A1    Jun. 15, 2023

(30) Foreign Application Priority Data
May 14, 2020  (GB) ...................................... 2007166
Oct. 30, 2020  (GB) ...................................... 2017230

(51) Int. Cl.
*E02B 3/12*   (2006.01)
*E02D 17/20*  (2006.01)
*E02D 29/02*  (2006.01)

(52) U.S. Cl.
CPC .............. *E02B 3/123* (2013.01); *E02B 3/124* (2013.01); *E02D 17/205* (2013.01); *E02D 29/0208* (2013.01)

(58) Field of Classification Search
CPC .......... E02B 3/123; E02B 3/124; E02B 3/108; E02B 7/06; E01F 8/025; E02D 17/205; E02D 29/0208
See application file for complete search history.

(56) References Cited

U.S. PATENT DOCUMENTS 5,076,735 A    12/1991  Hilfiker
8,721,221 B2 *  5/2014  Cavenagh ............... E02B 3/108
                                                     405/116

(Continued)

FOREIGN PATENT DOCUMENTS

CN    213086712 U    4/2021
EP     1308562 A1    5/2003

(Continued)

*Primary Examiner* — Benjamin F Fiorello
(74) *Attorney, Agent, or Firm* — Johnson, Marcou, Isaacs & Nix, LLC

(57) ABSTRACT

An erosion prevention system, a cell assembly and a kit of parts for such a system, and methods of making and installing such an erosion prevention system is disclosed. A cell assembly (2501) may comprise a plurality of cells (2520*a*, 2520*b*, 2520*c*) for containment of rock pieces, each cell having a bottom, sides/ends and a top each formed from wire mesh. A continuous length of wire mesh may wrap around and defines the upper, lower (2502) and end faces (2503*a*, 2503*b*) of the cell assembly (2501), the ends of the length being fastened together at an overlapping join positioned on the upper and/or end of the cell assembly. The continuous length of chain-link wire mesh may extend beyond at least one side face (2503*d*) of the cell assembly, thereby being configured to overlap at least a portion of the lower, upper and end faces of a corresponding second cell assembly when positioned side by side. The wire mesh may be chain-link wire mesh.

17 Claims, 15 Drawing Sheets

(56) References Cited

U.S. PATENT DOCUMENTS

| | | | | |
|---|---|---|---|---|
| 8,721,229 | B2* | 5/2014 | Heselden | E02D 29/0208 405/15 |
| 9,260,830 | B2* | 2/2016 | Schneider | E02B 3/108 |
| 9,758,939 | B2* | 9/2017 | Adams | E02B 3/108 |
| 10,731,309 | B2* | 8/2020 | Adams | E03F 1/005 |
| 11,180,897 | B2* | 11/2021 | Waid | E02B 3/127 |
| 2006/0275084 | A1* | 12/2006 | Harbeck | E02B 3/108 405/116 |
| 2008/0264546 | A1 | 10/2008 | Olsta et al. | |
| 2009/0230373 | A1* | 9/2009 | Helseden | E02D 29/0266 256/25 |
| 2010/0111611 | A1* | 5/2010 | Olsta | E02D 29/0208 405/128.1 |
| 2012/0230766 | A1* | 9/2012 | Schnaars, Sr. | E02B 7/06 405/32 |
| 2013/0094905 | A1* | 4/2013 | Schnaars, Sr. | E02B 3/108 405/114 |
| 2015/0023733 | A1* | 1/2015 | Schnaars, Sr. | E02B 3/108 405/115 |
| 2015/0071708 | A1 | 3/2015 | Ferraiolo et al. | |
| 2016/0168837 | A1* | 6/2016 | Pettey | E03F 1/00 210/170.03 |
| 2019/0075738 | A1* | 3/2019 | Manning | E02D 29/02 |
| 2021/0029895 | A1* | 2/2021 | Han | A01C 7/085 |

FOREIGN PATENT DOCUMENTS

| | | |
|---|---|---|
| EP | 1881114 A2 | 1/2008 |
| GB | 845863 A | 8/1960 |
| JP | H07189229 A | 7/1995 |
| JP | H09256343 A | 9/1997 |
| JP | H1193132 A | 4/1999 |
| JP | 2001-107366 A | 4/2001 |
| JP | 3654852 B2 | 6/2005 |
| JP | 2008-180069 A | 8/2008 |
| JP | 2012-255308 A | 12/2012 |
| JP | 2016-020577 A | 2/2016 |
| JP | 2016-084608 A | 5/2016 |
| KR | 10-2004-0038036 A | 5/2004 |
| KR | 10-0666908 B1 | 1/2007 |
| KR | 10-0755754 B1 | 9/2007 |
| KR | 10-2009-0086795 A | 9/2009 |
| KR | 10-0950248 B1 | 3/2010 |
| KR | 10-1244710 B1 | 3/2013 |
| KR | 10-1897064 B1 | 9/2018 |

\* cited by examiner

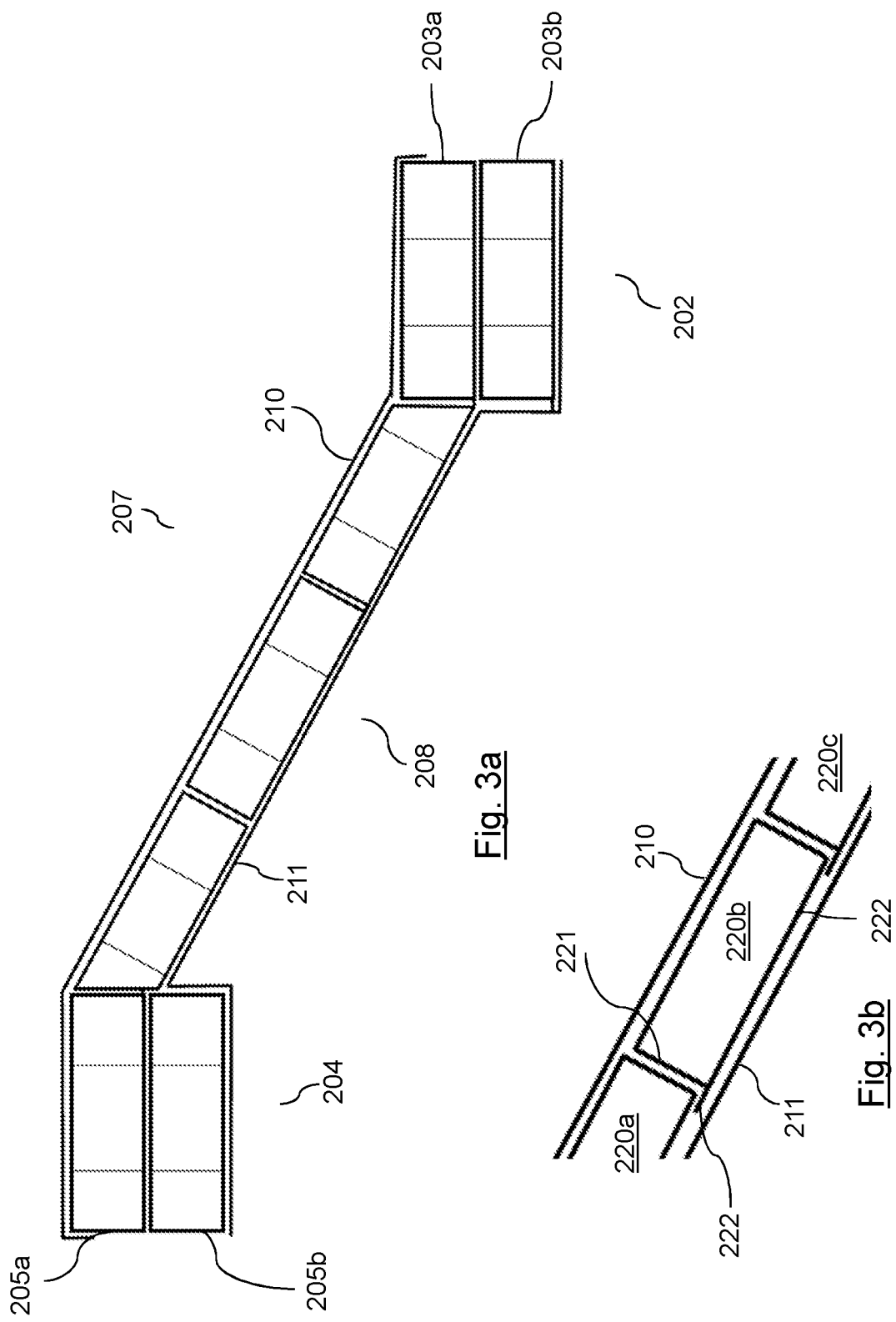

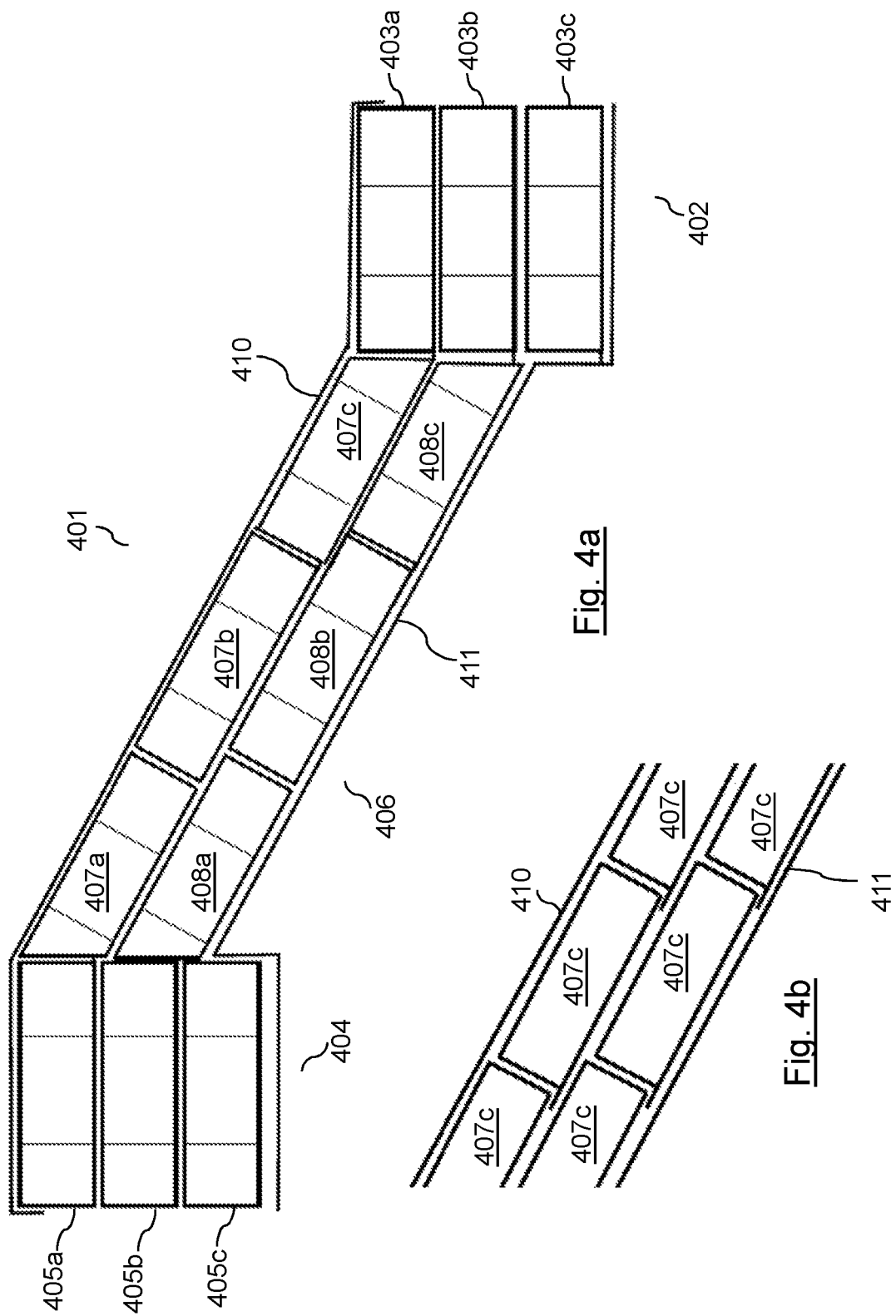

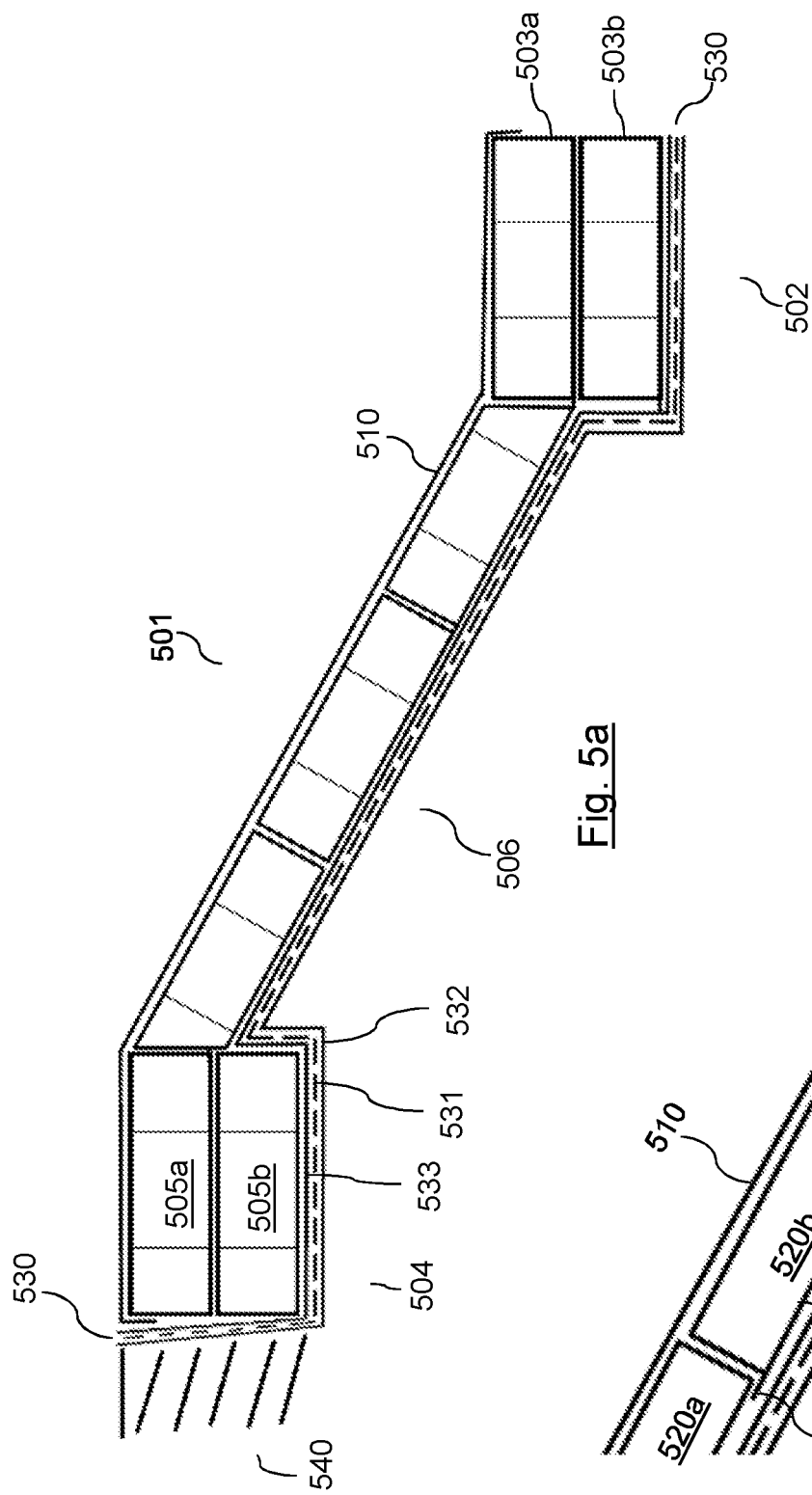
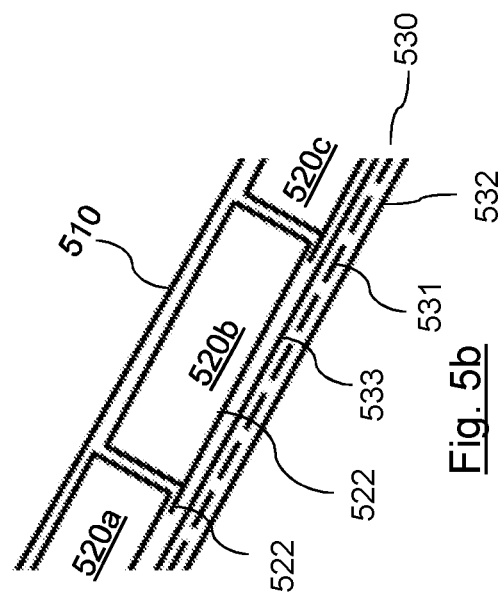

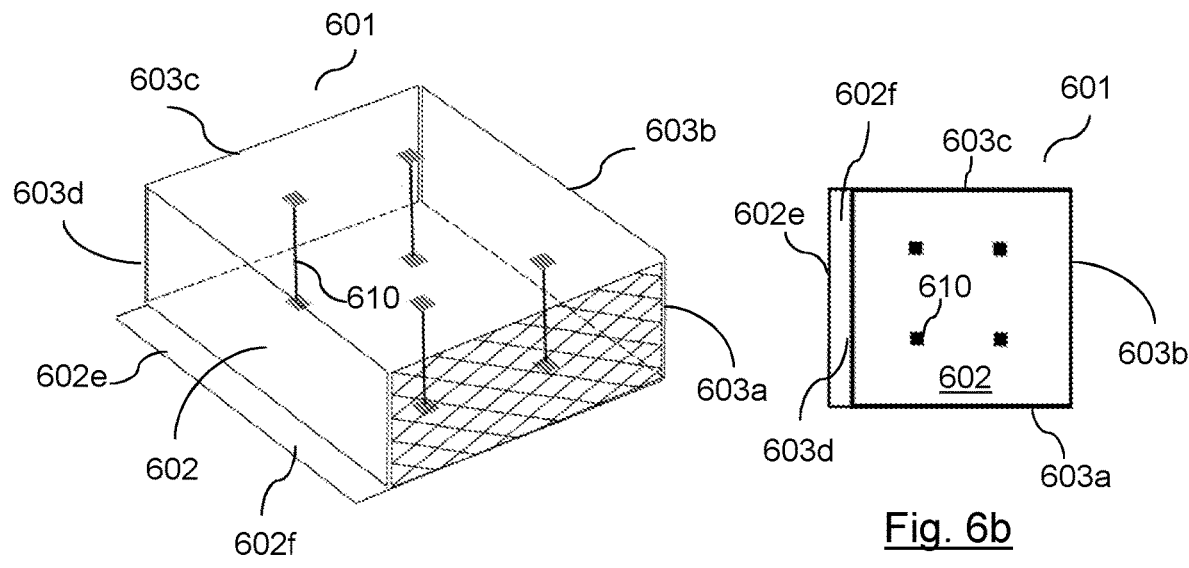
Fig. 6a
Fig. 6b
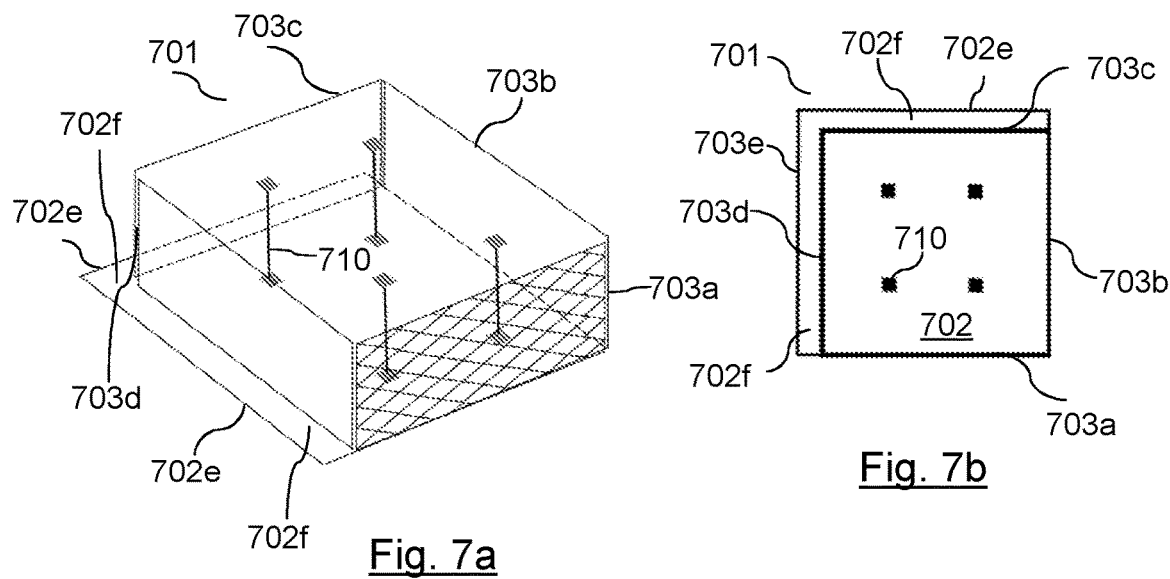
Fig. 7a
Fig. 7b

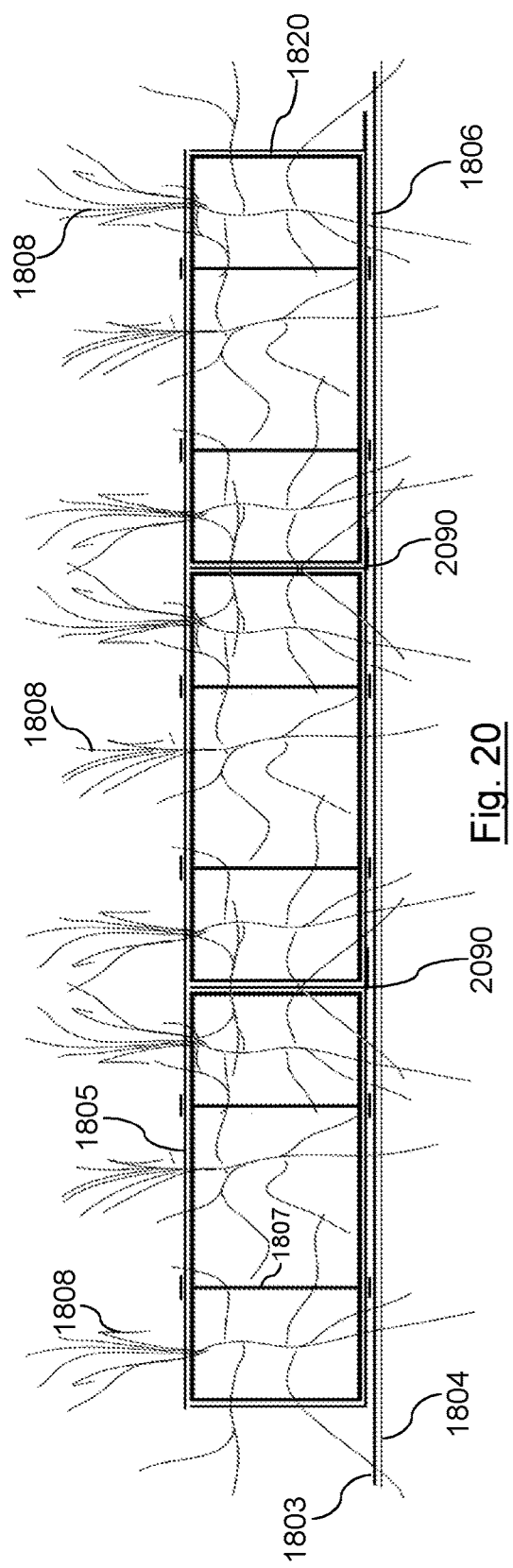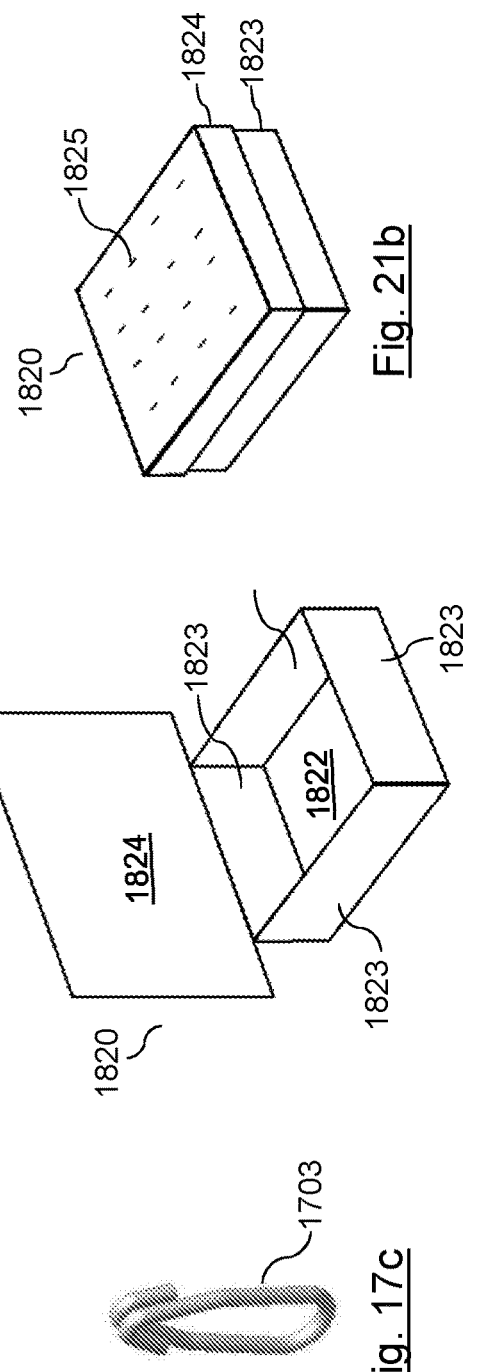

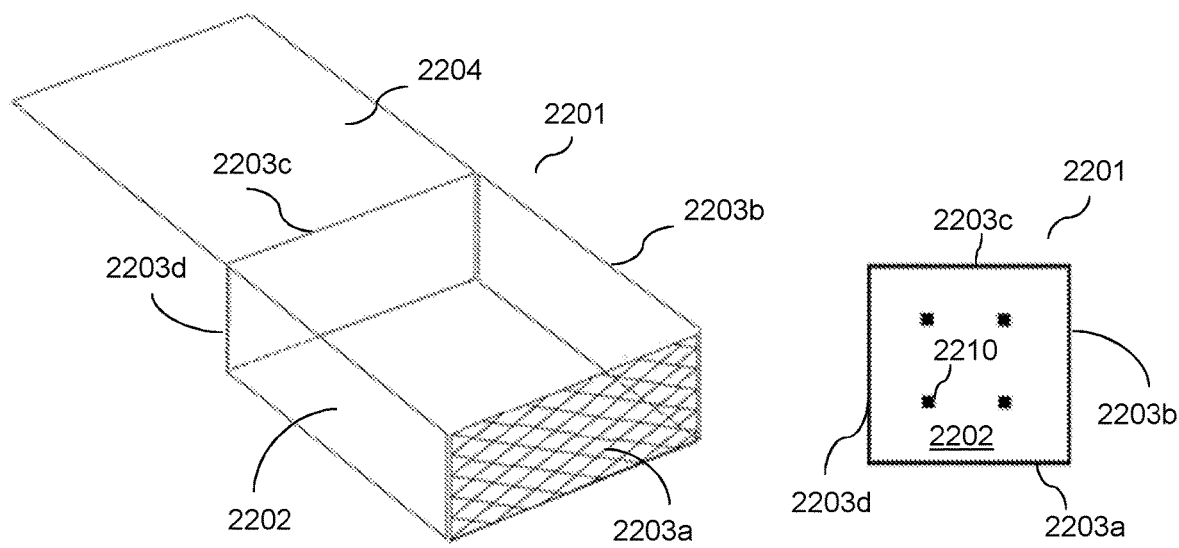
Fig. 22a
Fig. 22b
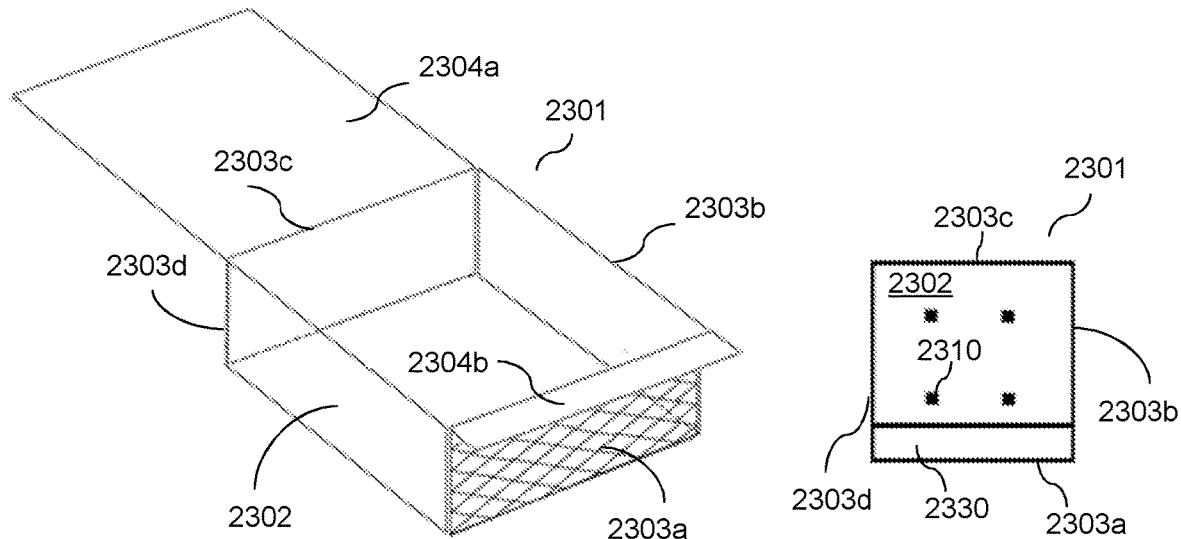
Fig. 23a
Fig. 23b

EROSION PREVENTION

CROSS-REFERENCE TO RELATED APPLICATIONS

This application is the 35 U.S.C. § 371 national stage application of PCT Application No. PCT/GB2021/051111, filed May 7, 2021, where the PCT claims priority to, and the benefit of, United Kingdom application entitled "Improvements in and relating to erosion prevention" having serial no. 2007166.8, filed May 14, 2020 and United Kingdom application entitled "Improvements in and relating to erosion prevention" having serial no. 2017230.0, filed Oct. 30, 2020, all of which are herein incorporated by reference in their entireties.

FIELD OF THE INVENTION

The present invention concerns an erosion prevention system and methods of installing an erosion prevention system. More particularly, but not exclusively, this invention concerns an erosion prevention system for use in preventing ground erosion by water, such as coastal erosion, for example erosion of beaches and sand dunes, sea-floor erosion, such as around manmade installations e.g. foundations, and inland erosion, for example erosion of riverbanks and lake shorelines.

BACKGROUND OF THE INVENTION

Coastal erosion results in the loss or displacement of earth, rock or sediment from the coastline due to the action of waves, tidal currents and storms on the shoreline. Coastal storms are particularly damaging to coastlines due to the generation of powerful waves which are capable of undermining banks, washing away sections of beaches and displacing large rocks and boulders up to several tonnes in weight. Coastal erosion devastates coastal communities because of loss of land and property into the sea, and has a significant economic impact. Coastal erosion can also cause damage to the local ecosystem, for example through ingress of brackish water into bodies of fresh water. Without implementation of mitigating measures, coastal erosion is expected to increase as climate change intensifies the severity and frequency of storms.

A frequently used form of coastal defence is rock armour. Rock armour typically comprises large boulders positioned on an inclined shoreline, with overlapping boulders forming a barrier to encroaching waves. In many beach settings, rock armour is not aesthetically attractive and does not blend into the environment. A significant disadvantage of rock armour is that the individual boulders, even boulders weighing many tonnes, can be moved by waves, especially during winter storms. Furthermore, the shoreline is a continuously changing, dynamic environment. Waves alter the level and gradient of a beach, which can undermine and destabilise rock armour, causing it to move out of position, often towards the water line. Such dislocation of the boulders leaves gaps in coastal defences, creating weak spots vulnerable to severe erosion for the duration of the storm. While rock armour often can be manoeuvred back into position, such work is costly and time consuming. This form of coastal defence therefore requires continuous maintenance.

Another disadvantage of rock armour is that it exposes a solid rock face to incoming waves. When this solid face is struck by waves, the wave's energy cannot be readily absorbed into the rock face and the energy is dissipated as spray and water deflected from the rock's surface. This spray and reflected surface water may be deflected high onto the shore, above the rock armour, depositing large volumes of water in a location where it may damage other infrastructure/property. Furthermore, such deflected water often erodes material from under the rock armour as it flows back to the sea.

Concrete armour is used in a similar manner to rock armour to protect shores and coastal structures. While concrete armour can be shaped to dissipate wave energy, such installations are often unsightly and prohibitively costly to install along large stretches of shore line. Furthermore, natural degradation of concrete armour over time can release cementitious material into the environment, exposing internal steel reinforcing bars which rapidly corrode, releasing further pollutants and making the installation even more unsightly. So-called 'wave walls' are another form of concrete coastal defence, typically consisting of a large continuous concrete wall having a convex face on the seaward side, shaped to reflect storm waves back into the sea. While such designs can be given a more attractive finish than concrete armour, and can help to avoid sea water splashing up over and behind the wall, wave walls are unmistakably artificial in appearance and very costly. The wall itself uses a lot of material, and usually requires deep foundations to prevent undermining of the wall if the beach level drops during winter storms. A 100 m section of wave wall may cost upwards of £1.5 m to design and install.

Some coastal defence installations utilise gabions, which are wire mesh baskets filled with smaller rocks. A coastal defence gabion may have a size of 2 m by 1 m by 1 m (i.e. 2 m$^3$), giving a mass (when filled with rock) of around 3 tonnes. FIG. 1a shows a conventional gabion 101 of those dimensions, subdivided by an internal partition 102 to form two 1 m$^3$ cells 103a, 103b. Each cell has a base 104, four sides 105 (only one side is labelled in FIG. 1a) and a lid 106. The lid 106 and base 104 spans both cells 103a, 103b. While the smaller rock sizes in gabions can help with dissipation of wave energy, the relatively low mass of individual gabions makes them susceptible to being moved by waves. Gabions can be made of a more elongate design (e.g. with a length and width considerably larger than their height), and/or attached in series to form a protective structure or "mattress" which is used to stabilise banks or cliffs from coastal erosion. FIG. 1b shows an alternative, conventional gabion design 110 with a larger lateral cross-sectional area. However, the joins between individual gabions are points of weakness vulnerable to fracture under the impact of waves. Loads on the joins between gabions are amplified by the relatively rigid and inflexible structure of each individual gabion. If not adequately maintained, failure of these joins can result in the mattress being pulled apart by the action of the sea. While such gabion structures can be relatively straightforward to install because they remove the need for transport of large rocks, installation tends to be very time-consuming as each gabion must be assembled and joined to its neighbours, for example by welding or fastening adjacent structures. Gabion mattresses may be formed from woven steel wire mesh. Gabions and gabion mattresses are typically manufactured from wire mesh, the wire being mild steel coated with a zinc, zinc/aluminium alloy, and/or plastic (e.g. pvc), and having a diameter of 2.0-3.0 mm and a tensile strength of 350 to 550 N/mm$^2$. Gabions can offer a relatively low cost form of coastal protection, but can have a lifetime as low as 5-10 years when exposed to harsh marine environments. An example of a gabion mattress is the Reno Mattress® available from Maccaferri®. Degradation of gabions presents a number of problems. Firstly, replacing defences is costly, and failure of defences can result in severe damage to property. Maintenance also tends to be costly, and often requires invasive measures that are highly disruptive and damaging to site ecology. Finally, decomposition of gabion components can release pollutants that contaminate the natural environment.

Geotubes or geotextile tubes are another form of erosion prevention device. Geotubes are hardwearing, tubular structures formed from a flexible, high tensile strength textile and filled with sand or soil. The length and diameter of the geotube can be tailored to a specific location and use, allowing the formation of continuous, high mass defences. Geotubes can be used as a barrier to incoming waves and also to prevent sand being washed away by collecting displaced sand and sediment. Geotubes are constructed from synthetic fabrics which do not blend into the natural environment unless covered, and which are vulnerable to damage if exposed, for example by vandalism or UV light induced degradation. Even when adequately protected from sunlight and vandalism, the material forming geotubes often naturally decays, which can lead to partial failure of sea defences and exposure of large amounts of unsightly, partially degraded geotextile material. When geotubes are exposed and/or moved during winter storms, it is very difficult to reinstate defences without damage to the tube material. Once damaged, geotubes are extremely vulnerable to complete failure as the soil/sand filling is rapidly scoured away by wave action.

In a similar manner, river floodwater can cause erosion of riverbanks, weakening the bank and increasing the likelihood of repeated flooding in the future. Riverbank erosion can occur in a number of ways. Firstly, excessive river levels and water flow velocity can erode the sides of riverbanks even when there is no flooding of the surrounding area. Additionally, when there has been flooding of surrounding areas, floodwater returning to the river can damage the riverbank as it recedes. Softer material along the top of or behind the river bank, and which is normally protected from erosion when the river is at its normal level, is particularly vulnerable. Repeated episodes of flooding can cause a vicious cycle of erosion lowering riverbank levels in localised areas, naturally favouring flow of floodwater across the damaged section. Furthermore, the slow erosion of softer material behind the riverbank will undermine the bank over time, eventually causing sections to collapse, and allowing the river to breach the bank.

Erosion defence products similar to those used in coastal defences have been employed for protection of riverbanks. However, while the forces to which riverbanks are exposed tend to be less violent than those experienced by coastal shorelines, the problems of scouring and undermining by excessive water flow persist. Accordingly, installation based around rock armour, gabions and geotubes are prone to premature failure. Furthermore, many riverbank sites are even less accessible than shoreline locations, and often more ecologically fragile. Consequently, maintenance is often infeasible.

EP1308562A1 discloses a gabion made from double-twist wire mesh coated with PVC, the base of the gabion having a protruding skirt that overlaps neighbouring gabions. The lid of the gabion does not overlap with neighbouring gabions. KR100755754B, KR101244710B and KR100950248B1 disclose similar systems with overlapping base skirts. KR1020090086795A discloses a gabion made from panels of welded wire mesh and having an extended base protruding into a slope; U.S. Pat. No. 5,076,735A, KR1020040038036A, JP2016084608A and JPH07189229A disclose further gabion systems with base extensions extending into a slope and/or over the top of offset stacked cells. Gabions constructed from double twisted wire mesh are also disclosed in US2015/0071708A1 and KR100666908B1; US2008/0264546A1 discloses a gabion system for controlling contaminants in soil, sediment or water, the gabions being lined with reactive geotextile mats; GB845863A, KR101897064B1 and JP2008180069A disclose gabions formed from chain-link wire mesh, with each panel of mesh being bounded by a stiff frame wire; in those disclosures, cells are separate units with no overlapping lids or bases. JP2016020577A discloses a device for connecting adjacent gabions to each other. The connecting device is a sheet of wire mesh that straddles the sides of adjacent gabions, and both the gabions and the connecting device may be made from a welded mesh, or a chain-link wire mesh provided with a stiffening wire surrounding the perimeter of each panel. The wire mesh sheet connecting devices are separate to the wire mesh sheets forming the gabions, being arranged with side-to-side overlaps. For assembly, open topped cells are made by joining together the bottom, sides, front and rear, then the cells are joined together with the connecting devices linking the bottom, front and rear of adjacent cells and ends. Finally, each cell is filled with stone, and the upper panels are added to close each cell, as well as another connecting device straddling the tops of adjacent cells. Problems encountered with such known gabion designs include premature structural failure of gabions themselves, and/or joins between gabions, and awkward and time-consuming construction on-site (often in challenging environments). Traditional gabion design requires that gabions can be fully assembled off-site, or folded up from a template on-site, and that gabions are free-standing to facilitate filling. Consequently, gabions are constructed from stiff/resilient mesh or utilise stiff framework wires, and panels are made to a pre-determined size. Mesh can be stiffened by welding intersections (introducing inherent weaknesses) or by entwined (e.g. double twist) mesh geometry (requiring relatively low-strength, malleable wires which are more vulnerable to failure). Filling pre-sized gabions requires care: overfilling can distort gabions making them hard to close and join, underfilling can lead to unwanted buckling/ movement after installation. Furthermore, pre-sized gabions are difficult to install on uneven ground.

There remains a need to provide long-term, environmentally sensitive, low maintenance solutions to coastal and river erosion. The present invention seeks to mitigate the above disadvantages and provide an erosion prevention system, and method of making the system, which is durable, cost-effective and discrete.

SUMMARY OF THE INVENTION

Once installed, erosion protection systems of the invention may comprise multiple rock-filled cells constructed from a wire mesh. Aspects of the present invention provide improved erosion prevention systems, offering rapid, convenient and flexible installation, long-term resilience in challenging environments, and a discrete appearance sympathetic to natural surroundings. Features common to various aspects of the invention that help achieve such advantages include cell base and lid panels that extend across corresponding panels of neighbouring cells (providing securely linked cells that may behave as a monolithic structure even when subjected to severe wave action), chain-link wire mesh (rather than a rigid structure that bends, deforms and consequently weakens under stress, a chain-link wire mesh provides a flexible, self-tensioning structure that strengthens as it stretches across uneven and sometimes shifting ground), and overlapping joins between sheets of mesh (allowing cell sizes to be adjusted to suit the precise location for each cell, and the amount and nature of rock fill material available and suitable for the installation location). Some aspects of the invention may provide alternative solutions to problems of previously known systems.

According to a first aspect of the invention, there is provided a cell assembly having opposed upper and lower faces, opposed first and second end faces and opposed first and second side faces. Optionally, the cell assembly is a cell assembly according to the claims. The cell assembly comprises at least one cell for containment of rock pieces. Preferably, the cell has a bottom, first and second upstanding sides, at least a first upstanding end, and a top. The faces of the cell assembly, and optionally the bottom, top, sides and end(s) of the cell, are formed from chain-link wire mesh (such as steel wire mesh). A continuous length of chain-link wire mesh defines the opposed upper and lower faces and the opposed end faces of the cell assembly. It will be understood that a length of mesh 'defines' a face of a cell assembly when the length of mesh extends across the entire face. It will be appreciated that when a continuous length of chain-link wire mesh forms the lower, end and upper faces of the cell assembly, the length of mesh wraps around a circumference of the cell assembly, providing an especially strong and effective cell construction. It will be further appreciated that the woven chain-link structure of the wire mesh facilitates such a wrap-around structure without bending (and thus risking weakening) the wires of the mesh. Preferably, the side faces of the cell assembly are each defined by one or more a wire mesh side panels fastened to the length of mesh defining the lower, first end and upper faces of the cell assembly. Optionally, the wire mesh side panels and the length of wire mesh are fastened together at edges of the cell assembly faces by one or more tie wires and/or a plurality of clips. Optionally, at least one of the wire mesh side panels is spaced at least 150 mm, optionally at least 200 mm, for example at least 250 mm, inwards from a side edge the length of wire mesh. Optionally, the length wire mesh sheet extends beyond at least one side of the cell assembly and is configured to overlap with a lower, end and/or upper face of an adjacent cell assembly.

It will be understood that each sheet of wire mesh may have two opposed end edges two opposed side edges, with the cut ends of the wires forming the chain-link wire located at the side edges. It will be further understood that interlaced wires forming the chain-link mesh extend across the plane of each sheet from one side edge to the opposed side edge, in a general direction parallel to the opposed end edges. Optionally, the cut ends are knotted, for example knotted together to close the mesh openings running along each side edge of the mesh. Optionally, the cut end of each wire is knotted into a loop that interlocks with a corresponding loop on the cut end of an adjacent wire. An especially useful form of wire mesh is TECCO® wire mesh provided by GEOBRUGG®.

Preferably, the continuous length of wire mesh has a first end and a second end, wherein the first end and the second end are fastened together at a join, e.g. located on upper, first end or second end face of the cell assembly, preferably at least partially on the upper face (e.g. on the upper face). Optionally the join is an overlapping join, wherein the first end overlaps the second end.

Optionally, the continuous length of wire mesh is formed from a single continuous sheet of wire mesh, for example with the opposing ends of the sheet joined end to end. It has been found that forming the length from a single sheet provides consistent mesh geometry from end to end (avoiding, e.g., excessive misalignment of the mesh pattern), simplifies installation and improves structural integrity. In a single continuous sheet of chain-link wire mesh, each wire in the body of the mesh (i.e. every wire apart from the wires at the opposing ends of the sheet) is interlaced with two neighbouring wires (one on each side). Typically, chain link wire mesh is provided as a pre-manufactured roll. If a roll of mesh has insufficient length to form the required continuous length of wire mesh, two or more rolls may be strung together by interlacing the end wires, thereby forming a single continuous sheet of wire mesh. End wires may be interlaced directly with each other (e.g. by unlacing/unweaving the end wire from at least one sheet (optionally both sheets) and then lacing/weaving the end wire(s) back into both sheets) or by inserting one or more (preferably two) strands of chain-link wire substantively identical to those of the rolls in terms of shape, material and dimensions. In such an arrangement, the connection between rolls is not discernible across the mesh once the wires are interlaced—there is no variation in the mesh pattern, nor in shape/dimension of wires forming the mesh. In contrast, separate sheets of mesh joined together end to end or side to side by, e.g., fastening loops or spirals (such as helicoil fasteners) would not be considered to be a single continuous sheet.

Alternatively, the continuous length of wire mesh is formed from a plurality of separate sheets of wire mesh, for example wherein each sheet is joined end to end. It will be understood that separate sheets of wire mesh form a continuous length of wire mesh when the sheets have the same orientation, for example when the mesh sheets are joined with an end edge of a first mesh parallel to an end edge of a second mesh. First and second chain-link wire mesh sheets have the same orientation when the joined general direction in which the interlaced wires extend across the plane of the first sheet is parallel to the general direction in which interlaced wires extend across the plane of the second sheet.

Optionally, one or more, or all, end to end joins between sheet ends are located at an edge between cell assembly faces, optionally an edge positioned between the upper face and an end face. Additionally or alternatively, one or more, or all, end to end joins are located on a face of the cell assembly, such as spaced apart from an edge of the cell assembly. Locating a join on a face of the cell may allow more convenient closure of the cell during assembly. Optionally, one or more, or all, joins are located on the upper face of the cell assembly. Optionally, one or more, or each, end to end join is an overlapping join, for example with one sheet end overlapping another sheet end. An overlapping join may facilitate a stronger fastening between the sheets. Additionally or alternatively, an overlapping join may provide a more convenient fastening during cell assembly, for example providing better allowance for variations in cell dimensions during filling and/or allowing the sheet of mesh to be pulled taut, further improving the strength and resilience of the cell assembly. It will be appreciated that an overlapping join may be located entirely on a face of the cell assembly, or spanning an edge so that the overlapping join extends across at least a portion of two adjacent faces. Optionally, the overlap is at least 80 mm, such as at least 150 mm, for example at least 200 mm. It will be understood that the overlap is the distance across the overlap separating the end edges of the sheets. Optionally, the overlap is at least one row of mesh openings, such as at least two rows of mesh openings, for example at least three rows of mesh openings. It will be understood that the overlap is x rows of mesh openings when x rows of openings of one sheet end overlap x rows of openings of the other sheet end.

Optionally, the cell assembly has an approximately cuboid shape. Optionally, sides of the cell are opposed upstanding sides, and the cell comprises a second upstanding end opposing the first upstanding end. For example, the cell may have a cuboid shape. Preferably, the bottom of the cell is aligned with and/or is formed by at least part of the lower face of the cell assembly. Additionally or alternatively, at least one end of the cell is aligned with and/or is formed by at least part of an end face of the cell assembly. Additionally or alternatively, at least one side of the cell is aligned with and/or is formed by at least part of a side face of the cell assembly.

Optionally, at least one side face of the cell assembly is defined by a second continuous length of chain-link wire mesh that at least partially wraps around one or two adjacent face(s) of the cell assembly. It will be understood that in this context the continuous length of wire mesh defining the bottom, first and second ends and top of the cell assembly is the first length of wire mesh. Preferably, at least a portion (for example one or both ends) of the second continuous length overlaps a portion of the first continuous length of wire mesh, e.g. with the continuous lengths fastened together by an overlapping join positioned on adjacent face(s). The second continuous length may optionally incorporate any feature described in relation to the first continuous length, e.g. being formed from a single continuous sheet of wire mesh or from a plurality of separate sheets of wire mesh joined end to end. Optionally, a first side face is defined by the second continuous length of chain-link wire mesh, and a second opposing side face is defined by a third continuous length of chain-link wire mesh; or both the first and second opposed side faces may be defined by the second continuous length which extends across a bottom, end or top face (preferably bottom) of the cell assembly, thereby overlapping the first continuous length on that face. Such a double layer of mesh on one face has been found to increase strength, and added strength to the bottom may be especially useful if the cell requires lifting (e.g. when installation comprises filling and closing cells in one location, such as at an assembly site or on a floating vessel, and then lifting/lowering cells into a final location, such as an underwater location). Optionally, one or both ends of the second continuous length at least partially wrap around a further face between the first and second opposed faces, again overlapping the first continuous length, e.g. wherein opposed ends of the second continuous length are joined end to end. It will be appreciated that the end to end join may be any join as described in relation to the first continuous length, and/or the join may be located on any face (e.g. on one or more of the side, end and top faces, preferably the top face). Optionally, a first continuous chain-link wire mesh formed from a single sheet joined end to end at a first join defines the bottom, opposed ends and top faces of a cell assembly, and a second continuous chain-link wire mesh formed from a single sheet joined end to end at a second join defines the opposed sides of the cell assembly. Optionally the first and second join are each overlapping joins and/or are located on an opposed end and/or top face of the cell assembly, for example on the same face, such as the top face. Optionally, the second (and optionally third, if present) continuous length is positioned inside the first continuous length (the second/third continuous length forming an inner mesh layer), or is positioned outside (to form an outer mesh layer), or is positioned inside the first continuous length on one face and outside the first continuous length on another opposed face. It has been found that such an inside/outside wrap imparts particularly high cell strength. It will be understood that 'inner' and 'outer' are terms relative to the interior of the cell assembly Preferably, the wire mesh side panel has two opposed end edges two opposed side edges, with the cut ends of the wires forming the chain-link wire located at the side edges, wherein interlaced wires forming the chain-link mesh extend across the plane of each sheet from one side edge to the opposed side edge, in a general direction parallel to the opposed end edges. Optionally, the cut ends are knotted, for example knotted together to close the mesh openings running along each side edge of the mesh. Optionally, the cut end of each wire is knotted into a loop that interlocks with a corresponding loop on the cut end of an adjacent wire. An especially useful form of wire mesh is TECCO® wire mesh provided by GEOBRUGG®. When rolls of mesh are strung together by interlacing end wires to form a single continuous sheet of mesh, knotted loops on the interlaced end wires may be clipped together rather than interlocked, e.g. where equipment for interlocking wire ends is not available. It will be understood that such an arrangement does not alter the sheet geometry, since the end wires are fully interlaced along their length.

Optionally, the cell assembly comprises a plurality of cells, each cell having a bottom, first and second upstanding sides, at least a first upstanding end, and a top, wherein the bottoms, the sides and the tops are formed from chain-link wire mesh. Providing a plurality of cells can allow formation of a cell assembly of particular high mass, while also avoiding undue movement of material within the cell assembly. Optionally, at least one side of each cell is defined by a chain-link wire mesh side panel that defines a side of an adjacent cell. Additionally or alternatively, at least one end of each cell is defined by a chain-link wire mesh end panel that defines an end of an adjacent cell. Accordingly, it will be appreciated that the cell assembly may optionally comprise a plurality of cells arranged side-by-side, and/or end-on-end. Providing multiple cells may provide a multi-cell structure with intimately and resiliently linked cells. It will be understood that cells arranged end-to-end may optionally have sides defined by a side panel common to two or more cells (i.e. one side panel defining the sides of two adjacent cells). Similarly, cells arranged side-by-side may optionally have ends defined by an end panel common to two or more cells (i.e. one end panel defining the ends of two adjacent cells). Optionally, each of the plurality of cells has an approximately cuboid shape. Optionally, sides of each cell are opposed upstanding sides, and each cell comprises a second upstanding end opposing the first upstanding end. For example, each cell may have a cuboid shape. Preferably, the bottom of each cell is aligned with and/or is formed by at least part of the lower face of the cell assembly. Additionally or alternatively, at least one end of each cell is aligned with and/or is formed by at least part of an end face of the cell assembly. Additionally or alternatively, at least one side of each cell is aligned with and/or is formed by at least part of a side face of the cell assembly.

Optionally, the cell assembly is a single cell assembly comprising one cell. It will be appreciated that when the cell assembly is a single cell assembly, the continuous length of chain-link wire mesh defining the lower, end and upper faces of the cell assembly forms the bottom, ends and top of the cell.

Optionally, the continuous length of chain-link wire mesh extends beyond at least one side face (e.g. both side faces, preferably one side face) of the cell assembly. Optionally, said length of wire mesh may be configured to overlap at least a portion of a second cell assembly, such as when said second cell assembly is positioned adjacent to and/or to abut the cell assembly. For example, said length of wire mesh may be configured to overlap at least a portion of each of a lower face and an upper face of the second cell assembly, and optionally also at least a portion of a first end face of the second cell assembly, and optionally also at least a portion of a second end face of the second cell assembly. Optionally, the cell assembly is configured to nest with a second cell assembly. It will be understood that the cell assembly nests a second cell assembly when wire mesh forming the lower, end and upper faces of the cell assembly extend around and overlap at least a portion of the lower, end and upper faces of the second cell assembly. Such an arrangement could also, for example, be described as telescoped.

It will be appreciated that the cell assembly of the first aspect of the invention may incorporate any feature described in relation to any aspect of the invention described below, especially the fifth or sixth aspects of the invention, and vice versa. In particular, the wire mesh is optionally formed from high tensile steel wire, such as wire having a diameter of at least 2 mm and a tensile strength of at least 1,000 N/mm$^2$, optionally wherein the wire mesh has a tensile strength of at least 75 kN/m, optionally wherein the tie wires and/or the plurality of clips, if present, are formed from high tensile steel wire having a diameter of at least 2 mm and a tensile strength of at least 1,000 N/mm$^2$. Optionally, the wire mesh, and optionally the tie wires and/or the plurality of clips if present, is formed from stainless steel wire, such as austenitic stainless steel wire. By way of further examples, it will be understood that the cell assembly of the first aspect of the invention may comprise the bracing assemblies, scour prevention layer, water barrier layer, and/or fines barrier described in relation to the fifth aspect of the invention. For example, each cell may comprise at least one brace assembly tying the wire mesh defining the bottom of the cell to the wire mesh defining the top of the cell, for example wherein each brace assembly comprises a lower brace plate disposed below the wire mesh of the bottom of the cell, an upper brace plate disposed above the wire mesh of the top, and a tensioning cable joining the lower brace plate to the upper brace plate (e.g. a vertical brace assembly). Additionally or alternatively, each cell may comprise at least one horizontal brace assembly tying the wire mesh defining a first side of the cell to the wire mesh defining a second opposed side of the cell, for example wherein each brace assembly comprises a first brace plate disposed outside the wire mesh of the first side of the cell, a second brace plate disposed outside the wire mesh of the second side, and a tensioning cable joining the first brace plate to the second brace plate. It will be understood that the brace assembly may, for example, span two or more cells of the cell assembly. Optionally, each cell comprises a water permeable fines barrier for preventing passage of granular material therethrough, the fines barrier being disposed below the wire mesh defining the top of the cell, optionally wherein the fines barrier lines the top of said cell adjacent to the wire mesh defining the top. Optionally, the fines barrier lines the sides and end of the cell adjacent the wire mesh defining the sides and ends, and optionally the bottom of the cell adjacent the wire mesh defining the bottom. Optionally, the fines barrier is in the form of a bag having a bottom lining the bottom of the cell, sides lining the sides and end of the cell, and a top flap lining the top of the cell. Optionally, the fines barrier is formed from a biodegradable material, such as sheep wool, or coconut fibre based material. It will be further appreciated that the cells of the cell assembly may, for example, be sized as described in relation to the first and/or sixth aspects of the invention.

Optionally, the cell assembly comprises a strengthening grid positioned inside one or more cells, e.g. in each cell. Optionally, the strengthening grid is a rigid wire mesh, such as a welded wire mesh (e.g. as commonly referred to as reinforcement mesh). Preferably, the rigid mesh is a grid of steel rods (such as ribbed steel rods) having a first layer of parallel spaced apart rods ("longitudinal wires") overlaid by a second layer of parallel spaced apart rods ("crosswires"), the rods of the second layer being oriented perpendicular to rods of the first layer and being welded to the rods of the first layer at each intersection. Preferably, the rods have a diameter of at least 8 mm, such as at least 10 mm, for example at least 12 mm, and/or the parallel rods have a spacing of no more than 250 mm, such as 200 mm, for example 150 mm, optionally 100 mm. An example of a suitable wire mesh is A393 mesh. Preferably the wire mesh is a stainless steel (e.g. austenitic stainless steel) wire mesh. It may be that a strengthening grid helps to stiffen the cell assembly, e.g. allowing the cell assembly to be lifted more conveniently once fully or partially filled with rock pieces. Optionally, the strengthening grid extends across at least a portion of the interior of the cell assembly, for example in a plane parallel to the bottom face. Optionally, the strengthening grid extends across at least 50%, such as at least 75%, for example at least 90%, of first and/or second widths of the cell, the first internal width being the distance between opposed ends, and the second between opposed sides, of the cell. Additionally or alternatively, the strengthening grid extends across at least 25%, such as at least 50%, for example at least 90%, of the internal area of the cell in a plane parallel to the bottom face of the cell assembly. Optionally, the strengthening grid is spaced apart from the top and/or bottom face of the cell assembly, e.g. separated by fill material (e.g. rock pieces), such as separated from the top and/or bottom face of the cell assembly by at least 25%, such as at least 40%, e.g. about 50%, of the average distance separating the top and bottom faces of the cell assembly. Alternatively, the strengthening grid is positioned against the inside of the bottom or top (preferably bottom) surface of the cell assembly. Preferably, the cell assembly comprises a single cell. Optionally, the cell assembly additionally comprises one or more (e.g. at least two) bracing assemblies, for example vertical and/or horizontal bracing assemblies as described herein, e.g. wherein each bracing assembly is configured for attachment to a cell lifting device (such as a crane), e.g. as described herein. Optionally, the cell assembly comprises one or more (e.g. at least two) horizontal bracing assemblies arranged below (e.g. immediately below) or threaded through the strengthening grid, and or one or more (e.g. at least two) vertical bracing assemblies arranged to pass through the strengthening grid. It has been found that the strengthening grid may conveniently facilitate lifting of the cell assembly by the bracing assemblies when fully or partially filled with rock pieces by reducing the tendency of the cell assembly to sag/distort. Additionally or alternatively, each bracing assembly may be configured for attachment to the bracing assembly of a neighbouring cell assembly, providing another means of securing cells together (especially useful when, e.g., cell panels do not overlap with panels of neighbouring cells).

According to a second aspect of the invention, there is provided an erosion prevention system comprising a plurality of cell assemblies according to the first aspect of the invention. For example, the erosion prevention system comprises a first cell assembly and a second cell assembly. Preferably, the cell assemblies are fastened together by one or more tie wires and/or a plurality of clips. Preferably, one or more of the cells forming the first cell assembly is arranged side by side one more cells forming the second cell assembly. It will be appreciated that the cell assemblies may, for example have independent side panels forming the adjacent side faces of the cell assemblies, for example wherein a side panel of the first cell assembly abuts a side panel of the adjacent cell assembly. Preferably, said side panels of abutting cell assemblies are fastened together by one or more tie wires and/or a plurality of clips. Alternatively, the cell assemblies may share common side panels, for example wherein a single side panel forms at least a portion of a side face of the first cell assembly and at least a portion of a side face of the second cell assembly. It will be appreciated that such an arrangement reduces the amount of mesh used to form the erosion prevention system. Preferably, the erosion prevention system is an erosion prevention system according to the claims.

Optionally, the wire mesh sheet defining the lower, end and upper faces of each cell assembly overlaps or is overlapped by (e.g. overlaps) another continuous length of chain-link wire mesh defining lower, end and upper faces of an adjacent cell assembly. Preferably, the cell assemblies are joined together at the overlap by an overlapping join, for example wherein the wire mesh sheets of the cell assemblies are fastened together by one or more tie wires and/or a plurality of clips. Preferably, the one or more wire mesh panels forming at least one side face of the cell assembly are spaced at least 150 mm, such as at least 200 mm, for example at least 250 mm, inwards from the side edge of the continuous length of chain-link wire mesh defining the lower, end and upper faces pf the cell assembly. For example, said length of wire mesh extends beyond at least one side face of the cell assembly and/or is configured to overlap at least a portion of the lower and upper faces (and optionally one or both end faces) of the second cell assembly. Optionally, the cell assemblies are nested together. It will be understood that cell assemblies are nested together when wire mesh extending around the periphery of the first cell assembly extends around the periphery of the second cell assembly, overlapping wire mesh of the second cell assembly.

It will be appreciated that the erosion prevention system of the second aspect of the invention may incorporate any feature described in relation to any aspect of the invention described below, especially the fifth and sixth aspects of the invention, and vice versa.

According to a third aspect, there is provided a kit of parts for forming the cell assembly of the first aspect of the invention, the kit of parts comprising one or more chain-link wire mesh sheets for forming the continuous length of chain-link wire mesh defining the lower, end and upper faces of the cell assembly, and at least two wire mesh side panels for forming the first and second side faces of cell assembly. Optionally, the kit of parts comprises fastenings for securing together the one or more wire mesh sheets and the at least two wire mesh side panels, for example comprising tie wires and/or clips. Optionally, the kit of parts comprises a plurality of wire mesh panels for defining the sides and/or ends of the one or more cells forming the cell assembly. Optionally, the kit of parts comprises a plurality of brace assemblies for tying the wire mesh defining the bottom to the wire mesh defining the top of each cell, optionally wherein each brace assembly comprises a lower brace plate, an upper brace plate, and a tensioning cable for joining the lower brace plate to the upper brace plate, and optionally a one-way clip for holding the upper brace plate in position on the cable. Optionally, the kit of parts comprises a plurality of water permeable fines barriers for preventing passage of sand therethrough, each fines barrier being sized and configured for disposal inside each cell, optionally wherein each said fines barrier is sized and configured to line the top, bottom, sides and/or end(s) of the cell, optionally wherein each fines barrier is formed from a biodegradable material such as sheep wool, or coconut fibre based material, optionally wherein the kit of parts additionally comprises a plurality of live plants, such as live grass plants, and/or plant seed, such as grass seed. Optionally, the kit of parts comprises a scour prevention layer for disposal below the cell assembly. Preferably the kit of parts is a kit of parts according to the claims.

It will be appreciated that the kit of parts of the third aspect of the invention may incorporate any feature described in relation to any aspect of the invention described below, especially the seventh and eighth aspects of the invention, and vice versa.

According to a fourth aspect of the invention, there is provided a method of constructing an erosion prevention system, the method comprising: assembling a cell assembly according to the first aspect of the invention. Optionally, assembling the cell assembly comprises fastening the continuous length of wire mesh for defining the lower, end and upper faces of the cell assembly to a plurality of wire mesh panels for defining the side faces of each cell of the cell assembly, and optionally to a plurality of wire mesh panels for forming the sides and/or ends of each cell, so that each cell has an open top. The method further comprises inserting fill material into each cell, and securing the continuous length of chain-link wire mesh across the upper face of the cell assembly by fastening the ends of the continuous length of chain-link wire mesh sheet, and fastening the continuous length of chain-link wire mesh to said wire mesh panels, thereby closing each cell. Preferably, the wire mesh sheet(s) and panels are fastened together using a plurality of clips and/or tie wires. Optionally, the method comprises installing at least part of one or more bracing assemblies into each cell before the step of inserting fill material into the cells, and completing the bracing assemblies after the step of closing the cells to tie the wire mesh defining the bottom to the wire mesh defining the top of each cell. Optionally, the method comprises inserting into each cell portion a water permeable fines barrier for preventing passage of sand and/or soil therethrough, either immediately before, during, or immediately after the step of inserting fill material into said cell. Optionally, each fines barrier is in the form of a bag, and the method comprises inserting each fines barrier into a cell before the step of inserting fill material, arranging the bag so that the bottom and sides of the bag line the bottom and sides of the cell, filling each bag with fill material thereby inserting fill material into the cells, and closing the top flap of the bag over the fill material before the step of closing the cells. Optionally, the method comprises 1) adding plant seed to the fill material; and/or 2) inserting the roots of a plurality of live plants, such as live grass plants, and/or plant seed, such as grass seed, through openings in the top of the fines barrier before or after the step of closing the cells. Optionally, the method comprises assembling one or more additional cell assemblies according to same method, and securing the cell assemblies together. It will be appreciated that the step of securing the cell assemblies together may be performed before, during or after the step of inserting fill material into each cell. For example, each cell may be filled (and optionally closed) before the assemblies are fastened together. Alternatively, the cells of a first assembly may be filled (and optionally closed), and a second assembly fastened to the first assembly before the cells of the second assembly are filled (and optionally closed). Alternatively, a first assembly may be secured to a second assembly before the cells of either assembly are filled. It will be further appreciated that according to any assembly method, one or more cells of one or more assemblies may optionally be partially filled before assemblies are fastened together. Preferably the method of constructing an erosion prevention system is a method according to the claims.

It will be appreciated that the method of the fourth aspect of the invention may incorporate any feature described in relation to any aspect of the invention described below, especially the tenth aspect of the invention, and vice versa.

The present invention provides, according to a fifth aspect, an erosion prevention system comprising a plurality of cells for containment of rock pieces, each cell having a bottom defined by a base panel, at least three upstanding sides each defined by a side panel, and a top defined by a lid panel; the base, side and lid panels each being formed from mesh and preferably being fastened to each other along cell edges. Preferably, each cell has a length of 1-5 m, a width of 1-5 m, a height of 0.5-2 m, and an internal volume of 0.5-50 $m^3$. Additionally or alternatively, each cell as a length of at least 0.5 m and a width of at least 0.5 m. Additionally or alternatively, each cell has a length of up to 10 m, for example up to 5 m. Additionally or alternatively, each cell has a width of up to 5 m, such as up to 4 m. Additionally or alternatively, each cell has an internal volume of at least 0.1 $m^3$, such as at least 1 $m^3$, for example at least 4 $m^3$, optionally at least 9 $m^3$. Additionally or alternatively, each cell has an internal volume of up to 8 $m^3$, such as up to 10 $m^3$, for example up to 30 $m^3$. A first base panel of mesh extends across at least a portion of the bottom of a first cell and extends across at least a portion of the bottom of a second cell adjacent the first cell. Preferably, the first base panel defines the bottom of the first cell. Preferably, the first base panel is fastened to at least two side panels, such as at least three side panels, for example at least four side panels, of the second cell, for example at least partially along edges of the second cell. Additionally or alternatively, the first base panel preferably overlaps and is fastened to a second base panel extending across at least a portion of (e.g. defining) the bottom of the second cell. Such fastenings secure the first cell to the second cell. A first lid panel of mesh extends across at least a portion of the top of the first cell and extends across at least a portion of the top of a third cell adjacent the first cell. Optionally, the first lid panel defines the top of the first cell. Preferably, the first lid panel is fastened to at least two side panels, such as at least three side panels, for example at least four side panels, of the third cell, for example at least partially along edges of the third cell. Additionally or alternatively, the first lid panel preferably overlaps and is fasted to a third lid panel extending across at least a portion of (e.g. defining) the top of the third cell. Those fastenings secure the first cell to the third cell. The third cell is different to the second cell. A second lid panel different to the first lid panel extends across at least a portion of the top of the second cell. Optionally, the second lid panel defines the top of the second cell. A third base panel different to the first base panel extends across at least a portion of the bottom of the third cell. Preferably, the third base panel defines the bottom of the third cell. Optionally, the mesh is a wire mesh.

Each cell may be of any convenient shape. For example, each cell may have a shape selected from triangular prism (wherein the triangular faces are the top and bottom of the cell, and the rectilinear faces are the sides), cuboid and hexagonal prism (wherein the hexagonal faces are the top and bottom of the cell, and the rectilinear faces are the sides). Cells need not all be the same shape. For example, the cells may be a combination of cubes and rectangular faced cuboids. Alternatively, cells may be a mixture of shapes. Preferably, each cell is cuboid.

It will be appreciated that each cell has a plurality of faces that intersect at cell edges. Each cell has at least five faces, made up of the cell top, bottom and at least three sides. Each cell is an enclosed cell, to contain rock pieces. Thus, all faces of the cell are defined by wire mesh panels, meaning that the side panels define all sides of said cell. Consequently, the internal volume of the cell is surrounded by the wire mesh panels on all faces of the cell.

The extension of the base panel defining the bottom of a first cell across at least a portion of the bottom of a second adjacent cell, and the extension of the lid panel of the first cell across at least a portion of the top of a third adjacent cell, allows formation of an especially secure and robust join between the adjacent cells. More particularly, the fastening of the base panel of the first cell to at least three side panels of the second cell, and/or the overlapping and fastening of the base panel to the base panel of the second cell provides an intimate and robust connection at the bottom of the cells. Similarly, the fastening of the lid panel of the first cell to at least three side panels of the third cell and/or the overlapping and fastening of the lid panel to the lid panel of the third cell, allows an intimate and robust connection at the top of the cells. Further, the unique configuration of especially robust connections between cells provides a secure join that results in the cells behaving as a unitary mass and helps to avoid weaknesses at the joins between cells.

As used herein, a panel 'defines' a face of a cell when the panel covers the entire inner surface of the cell face. For example, a panel that defines the top of a cell extends across the whole of the top of the cell in all directions, and forms the inner surface of the top facing the cell interior. As used herein, a panel is fastened to another panel at a cell edge when the panels are fastened together at least partially along the edge of the cell shared by the panels. For some panels, such a fastening may be at a peripheral edge of the panel, while for others such a fastening may be across an intermediate part of the panel. As used herein, a wire mesh 'panel' is a continuous sheet of wire mesh. In other words, each panel is made from a single continuous sheet of wire mesh, and is not made up of two or more sheets joined together by an identifiable join. Nevertheless, on any face of the cell, a panel may or may not overlap with another, separate panel.

It will be appreciated that a first panel is separate to a second panel when there is a discernible join linking an identifiable first panel to an identifiable second panel. For example, the panels may be joined by fastenings of an appearance and/or material different to that of the panels themselves. The fastenings used to form the join may or may not be continuous along the join, and may or may not be so secure that the two panels so joined behave as if they were formed from a continuous sheet of material.

It will be appreciated that the panels forming two or more adjacent faces of a cell, when not explicitly described as being separate panels, may for example be formed from a single continuous sheet of mesh. For example, two adjacent side panels of a cell may be formed from a single sheet of wire mesh, e.g. with a bend at the cell edge shared by the sides defined by the panels. Optionally, at least two of the side panels, such as all side panels, of each cell are formed from a single continuous sheet of wire mesh. Additionally or alternatively, the base panel and at least one side panel, and/or the lid panel and at least one side panel, of each cell are optionally formed from a single continuous sheet of wire mesh, e.g. with a bend at the cell edge shared by the bottom/top and side(s) defined by the panels.

As used herein, a cell may have an undivided internal volume. For example, each cell may be free from a wire mesh panel subdividing the cell into a plurality of sub cells. It will be understood that a bracing assembly positioned in a cell, if present, does not subdivide the internal volume of a cell.

Preferably, the erosion prevention system is a coastal erosion prevention system, such as configured for installation on a coastline requiring erosion protection, for example configured for installation on a beach. Additionally or alternatively, the erosion prevention system is a watercourse erosion prevention system, such as configured for installation along the side of a watercourse, for example configured for installation along a riverbank and/or embankment adjacent a river, canal or estuary.

Preferably, a second base panel, different to the first base panel, defines the bottom of the second cell, and the first base panel overlaps the second base panel across the bottom of the second cell. The region across which panels overlap (i.e. where at least one wire mesh panel lies against another, coplanar panel) is referred to herein as the 'overlap area'. Optionally, the base panels are fastened together in the overlap area. Overlapping, fastened panels have been found to provide especially secure and robust connections between cells.

Preferably, the sides of the first cell are defined by a first set of side panels, the sides of the second cell are defined by a second set of side panels, and the sides of the third cell are defined by a third set of side panels. Optionally, one of the first set of side panels overlaps and is fastened to one of the second set of side panels, and another of the first set of side panels overlaps and is fastened to one of the third set of side panels. Thus, the cells are optionally fastened together at their abutting sides, as well as at their tops and bottoms. Such an arrangement of fastenings has been found to be particularly effective at robustly joining cells together and causing the joined cells to behave as a monolithic structure, whatever the direction the stress forces arise from, e.g., wave impacts.

The wire mesh panels may be fastened together by any suitable connection system. Connection systems may be continuous (where multiple point connections are formed by a single device) or discontinuous (where point connections are each formed by a discrete device). A point connection is a single position at which a wire of one wire mesh is fixed to a wire of another wire mesh. Suitable continuous fastening devices include tie wires. Examples of suitable tie wires include flexible wire (e.g. woven in a zig-zag pattern through mesh openings of the fastened panels) and rigid wire (e.g. zig-zag or helicoil shaped rigid wire configured to stich the wire mesh of fastened panels together). A continuous connection device may provide at least one point connection per mesh opening along the length of the device. Suitable discrete fastening devices include clips, such as wire clips. Example wire clips include c-clips that can be closed around wires of adjacent panels, preferably where said wires lie against each other. Further example wire clips include pressed claw clips (such as the T1 pressed claw clip available from Geobrugg®) and spring clips (such as the T3 spring clip available from Geobrugg®).

Optionally, the base, side and lid panels of each cell are fastened together at the cell edges by one or more tie wires and/or a plurality of clips. Optionally, panels of a cell are fastened along a cell edge by a continuous fastening device that extends along more than 50%, such as at least 75%, for example at least 90%, of the length of the edge. Additionally or alternatively, panels are fastened along a cell edge by a plurality of discrete fastening devices, optionally wherein the fastening devices are spaced along the edge so that the spacing between neighbouring fastening devices and between each end of the edge and the nearest fastening device is no more than 30%, such as no more than 25%, for example no more than 20%, of the length of the edge. Additionally or alternatively, discrete fastening devices are spaced apart by a distance equal to the length and/or width of the mesh openings. Fastening devices arranged to provide point connections distributed along most of a cell edge provide particularly strong joins. It will be appreciated that a combination of continuous and discrete fastening devices may be used on the same edge.

Optionally, overlapping panels are fastened together by one or more tie wires and/or a plurality of clips. Optionally, overlapping panels of adjacent cells are fastened by at least one continuous fastening device, and/or at least one row of discrete fastening devices. Optionally, such a continuous fastening device extends across more than 50%, such as at least 75%, for example 90%, of the width of the overlap area. Additionally or alternatively, overlapping panels are fastened by a plurality of discrete fastening devices, optionally wherein the fastening devices are spaced across the width of the overlap area so that the spacing between neighbouring fastening devices and between opposed edges of overlap area and the nearest fastening device is no more than 30%, such as no more than 25%, for example no more than 20%, of the width of the overlap area. Fastening devices arranged to provide point connections distributed along most of the width of an overlap area provide particularly strong joins. Optionally, overlapping panels of adjacent cells are fastened by at least two such continuous fastening devices, or at least two rows of such discrete fastening devices, optionally wherein the at least two continuous fastening devices, or the at least two rows of such fastening devices are spaced apart across the length of the overlap area. Providing spaced apart, parallel arrays of point connections strengthens joins, not only because of the increased number of point connections, but also because the spaced apart arrays help to avoid one panel twisting away from the other panel along the one point connection array. It will be appreciated that a combination of continuous and discrete fastening devices may be used on the same overlap area.

The second cell abuts a first side of the first cell, and the third cell abuts a second side of the first cell. Optionally, the first and second sides of the first cell are adjacent sides of the first cell. For example, the first and second sides of the first cell share a common cell edge. It has been found that extending a first cell base panel across to an adjacent cell in a first direction, while extending the first cell lid panel to another adjacent cell in a second direction non-parallel to the first direction (e.g. perpendicular) provides an especially strong interconnection between cells.

Any suitable wire may be used to form the wire mesh panels. Optionally, the wire is high tensile wire, such as high tensile steel wire. Wire used to form tie wires and/or clips for fastening panels together is optionally high tensile wire, such as high tensile steel wire. As used herein, high tensile steel wire has a tensile strength of at least 1,000 N/mm$^2$, optionally at least 1,500 N/mm$^2$, such as at least 1,650 N/mm$^2$, at least 2, 200 N/mm$^2$ or at least 2,700 N/mm$^2$. Optionally, the high tensile steel wire has a tensile strength of up to 3,200 N/mm$^2$. Optionally, high tensile wire has a diameter of at least 2 mm, such as at least 3 mm, for example at least 4 mm. Optionally, high tensile wire has a diameter of no more than 8 mm, such as no more than 6 mm, for example no more than 5 mm. Such wire provides an effective balance between strength and flexibility. Optionally, the wire mesh used to form panels has a tensile strength of at least 75 kN/m, such as at least 100 kN/m, for example at least 130 kN/m. Mesh tensile strength is measured as described in European Assessment Document 230025-00-0106. Preferably, the high tensile wire is corrosion resistant steel wire. Optionally, the high tensile wire is formed from stainless steel, such as austenitic, ferritic or duplex stainless steel, preferably duplex stainless steel. It will be understood that stainless steel is an iron-based alloy having a chromium content of at least about 11% by weight. Duplex stainless steel has a mixed microstructure of austenite and ferrite, providing improved yield strength as compared to austenitic stainless steel. Optionally, the high tensile wire of the wire mesh panels, and/or the tie wires/wire clips, is formed from AISI 316 or AISI 318 stainless steel. Optionally, the high tensile steel wire has a corrosion-resistant coating, such as an aluminium-zinc alloy coating, for example a coating comprising about 95% Zn and 5% Al. Optionally, such a coating is present in an amount of at least 90 g/m$^2$, such as at least 100 g/m$^2$, for example at least 125 g/m$^2$. Corrosion resistant wire, especially stainless steel wire is especially useful in harsh outdoor environments, for example at coastal locations. Stainless steel components provide exceptional durability and lessen the environmental impact of the erosion prevention system. In particular, the longevity of stainless steel helps to avoid frequent maintenance and/or replacement of erosion prevention infrastructure, thus avoiding disturbance of the natural environment. Furthermore, the corrosion resistance of stainless steel also helps to avoid contamination of the natural environment by pollutants released during decomposition of conventional construction materials (such as concrete and/or conventional steel products).

Optionally, the wire mesh has openings with a width of 40-120 mm and a length of 60-200 mm, such as a width of 60-100 mm, and a length of 80-150 mm. The length of an opening is measured across the maximum diameter of the opening and width is measured perpendicular to the length across the plane of the mesh.

Preferably, the wire mesh is a woven or knitted mesh. In contrast to welded mesh, woven and knitted meshes offer greater internal flexibility. In a welded mesh, used for forming conventional gabion baskets, the wires forming the mesh tend to be arranged in a grid pattern, welded at every overlap. Such mesh sheets have very high rigidity. Consequently, it has been found that individual gabion baskets, even when joined together at multiple points, behave as individual rigid blocks. It has now been found that using a more flexible mesh can allow some distortion of cell shape when the erosion prevention system is subjected to external forces. More particularly, it has now been found that when woven and knitted meshes are used to form cells, distortion of cells due to movement of the contained rock pieces and/or ground underneath increases tension across the mesh throughout the system, increasing its strength and resilience against further external forces. The greater the strength and resilience of the erosion prevention system, the more effective it is, and the less maintenance it requires. Reduced maintenance saves cost and helps to reduce invasive interventions that can disrupt and damage the ecology of the installation site. Preferably, the wire mesh is chain-link wire mesh. Chain-link wire mesh, also referred to as diamond pattern woven wire mesh, is made up of a plurality of interlaced wires that all extend in the same general direction across the plane of the mesh. The wires are bent into a zig-zag pattern, so that each "zig" hooks with the wire immediately on one side and each "zag" with the wire immediately on the other, forming quadrilateral shaped openings. It will be understood that each pair of interlaced wires define a row of mesh openings extending across the width of the mesh. Optionally, the openings have an elongated diamond, or rhomboid shape. Chain-link wire mesh is distinct from other types of woven mesh in which wires are twisted together to wrap around each other by one or more complete turns at each intersection. An example of such mesh is hexagonal pattern mesh, similar in structure to mesh commonly referred to as "chicken wire". An example of such mesh is PVC coated steel wire mesh available from Maccaferri®. While such hexagonal pattern mesh may be used as the mesh forming the cells of the present invention, it has been found that chain-link mesh provides better flexibility within the sheet, and may be made more easily from high tensile strength wire. Optionally, when the mesh is a woven or knitted wire mesh, the cut ends of each wire are knotted, for example knotted together to close the row of mesh openings running along an edge of the mesh. Optionally, the cut end of each wire is knotted into a loop that interlocks with a corresponding loop on the cut end of an adjacent wire. Optionally, the mesh forming the side panels of the cell are oriented with the mesh edges having knotted wire ends running along the edges between sides and the lid panel, and between the sides and the base panel. An especially useful form of wire mesh is TECCO® wire mesh provided by GEOBRUGG®.

Preferably, at least one of the at least three side panels of each cell is spaced inwards from a peripheral edge of the base panel defining the bottom of said cell by at least 150 mm, such as at least 200 mm, for example at least 250 mm. Preferably, the base panel defining the bottom of the first cell extends below and overlaps the base panel defining the bottom of the adjacent second cell by at least 150 mm, such as at least 200 mm, for example at least 250 mm. Optionally, the base panel of each cell extends outwards from at least one side of the cell by at least 5%, such as at least 7%, for example at least 10%, of the width of the cell measured between said side and an opposed side or edge. Optionally, each cell has at least four upstanding sides, wherein at least two of the side panels of each cell are spaced inwards from the peripheral edge of the base panel defining the bottom of said cell by at least 150 mm, such as at least 200 mm, for example at least 250 mm. Optionally, the base panel defining the bottom of the first cell extends below and overlaps the base panel defining the bottom of the adjacent second cell by at least 150 mm such as at least 200 mm, for example at least 250 mm. Additionally, the base panel defining the bottom of the first cell extends below and overlaps a base panel defining the bottom of a further cell by at least 150 mm, such as at least 200 mm, for example at least 250 mm. The further cell is adjacent the first cell and different to the second cell. The further cell may or may not be adjacent the second cell. Optionally, the further cell is the third cell. Alternatively, the further cell is a fourth cell. Optionally, the base panel of each cell extends outwards from at least two sides of the cell by at least 5%, such as at least 7%, for example at least 10%, of the width of the cell measured between the side from which the panel extends and an opposed side or edge. Optionally, the base panel extends from opposed sides. Additionally or alternatively, the base panel extends from adjacent sides, in other words sides that share a common edge. Optionally, each cell has X upstanding sides, the side panels forming X/2 of the X upstanding sides are spaced inwards from the peripheral edge of said base panel by at least 150 mm, such as at least 200 mm, for example at least 250 mm, and X/2 of the upstanding sides are positioned at the peripheral edge of the base panel. Optionally, the base panel of each cell extends outwards from X/2 sides of the cell by at least 5%, such as at least 7%, for example at least 10%, of the width of the cell measured between the side from which the panel extends and an opposed side or edge, and the base panel terminates at X/2 sides of the cell. Optionally X is 4 or 6, for example 4. Optionally, when X=4, the base panel extends from opposed sides or from adjacent sides (in other words sides that share a common edge), preferably from adjacent sides. Optionally, when X=6, the base panel extends from alternating sides. Optionally, the plurality of cells comprise a plurality of first extended base cells and a plurality of second cropped base cells. An extended base cell has all side panels spaced inwards from the peripheral edges of the base panel, and/or a base panel so extending outwards from all sides of the cell. The base panel may be the same overall shape as the bottom of the cell, or a different shape. For example, the base panel extensions may be in the form of flaps (a flap for each side of the cell), or the base panel may extend outwards from the vertices at the bottom of the cell as well as from the edges at the bottom of the cell. A cropped base cell has all said side panels positioned at the peripheral edges of the base panel, and/or a base panel that terminates at each side of the cell. When assembled together, each side of an extended base cell that abuts another cell abuts a side of a cropped base cell, and each side of a cropped base cell that abuts another cell abuts a side of an extended base cell.

Optionally, when one or more side panels are spaced from the peripheral edges of the base panel, and/or the base panel extends outwards from one or more sides of the cell, the side panels are so spaced and/or the base panel so extends along at least 75%, such as along at least 90%, for example along the whole length of said side.

Optionally, the first base panel extends across at least a portion of the bottom of one or more cells different to the first and second cells, for example one or more cells different to the third cell. Optionally, the first base panel defines the bottom of the second cell, and optionally defines the bottom of one or more cells different to the first and second cells. Optionally, the first lid panel extends across at least a portion of the top of one or more cells different to the first and third cells, for example one of more cells different to the second cell. Optionally, the first lid panel defines the top of the third cell, and optionally defines the top of one or more cells different to the first and third cells. Optionally, one or more side panels is shared by adjacent cells to form a side of each cell. For example, each cell may optionally share a side panel with an adjacent cell such that a single side panel provides the only separation between the adjacent cells.

Optionally, each cell comprises at least one brace assembly tying the base panel defining the bottom of the cell to the lid panel defining the top of the cell (e.g. a vertical brace assembly). Optionally each such brace assembly comprises a lower brace plate disposed below said base panel, an upper brace plate disposed above said lid panel, and a tensioning cable joining the lower brace plate to the upper brace plate. Preferably, the brace assembly is configured to allow the cable to be tensioned, providing a positive force pulling the brace plates together. Preferably, the cable is securely attached to the lower brace plate by any suitable fixing. Optionally, the tensioning cable passes through a hole in the upper brace plate, and is held in place by a clip fastened to the cable above the upper plate (the clip being sized so that it cannot pass through the hole). Optionally, each cell comprises at least one corresponding horizontal brace assembly tying a first side panel defining a first side of the cell to a second side panel defining an opposing second side of the cell. The or each clip in any bracing assembly may be a one way clip that allows the clip to slide down/inwards along the cable as the upper/second plate is pushed towards the lower/first plate, and prevents the clip moving back up/outwards along the cable when the force pushing the upper/second plate is removed. It will be appreciated that both brace plates of any bracing assembly may be arranged with the tensioning cable passing through a hole in the brace plate and retained in place with a one-way clip. In such an arrangements, the cable may extend outwards from the top and bottom, or both opposed sides, of the cell. Suitable bracing assemblies include those manufactured by Platipus®. Additionally or alternatively, the bracing assembly may optionally comprise a threaded bar and retaining nut for connecting the tensioning cable to the upper/second brace plate, e.g. wherein an end of the tensioning cable is attached to the lower/first brace plate and the other end to a threaded socket sized to threadably receive an end of the threaded bar, and the upper/second brace plate comprises a through-hole sized to receive the other end of the threaded bar without allowing passage of the retaining nut when threaded onto the bar on the outside of the upper/second brace plate. Optionally, one or more of the bracing assemblies is configured for attachment to an anchoring device (such as a ground anchor and/or another corresponding cell assembly) and/or a lifting device (such as a crane attachment), for example to provide a convenient lifting and/or anchoring point for the cell. When a cell is anchored to a corresponding cell, the bracing assemblies of the cells may be configured for attachment to each other, for example, which may permit convenient fastening together of cells when not joined by overlapping mesh panels (e.g. when cells are installed in an underwater location). Optionally, the cell is suspendable and/or anchorable by one or more bracing assemblies when partially or completely filled with rock pieces. Optionally, an end of the tensioning cable (e.g. the end configured to protrude through a hole in a brace plate) is configured for, or attached to, an anchoring device and/or a lifting device. Additionally or alternatively, when the bracing assembly comprises a threaded bar, the bracing assembly may additionally comprise an anchoring and/or lifting cable attached to the threaded bar, e.g. by another threaded socket fastened to the table, the cable being configured for attachment to an anchoring device and/or lifting device.

Preferably, each cell is filled with rock pieces, such as rock pieces having a cross-sectional size in all dimensions larger than the cross-sectional size of the wire mesh openings. It will be understood that rock pieces often have irregular shapes, so even when filled with rock pieces, the interior of the cell may include large numbers of voids between rocks. Such voids could be filled with smaller rock pieces and/or granular material such as sand and/or soil. Additionally or alternatively, each cell may be filled with concrete pieces, for example to re-use concrete debris (if such a material is suitable for use at the installation location). The voids between rock pieces and optionally the voids between smaller rock pieces and granular material, can provide a porous structure through which wave energy may be dissipated. For example, when a wave impacts the erosion prevention system, water is able to fall between the rock and granular material into the voids. This can reduce the amount of water deflected by the erosion prevention system, for example beyond/behind the top of the system, thus reducing the amount of scour caused by water flowing back to its source. This porosity allows the erosion prevention system to behave in a similar manner to natural structures, helping the system to blend into the natural environment. In combination with the use of a wire mesh having high flexibility (especially enhanced when the wire mesh is chain-link mesh) and durability (particularly pronounced when the wire mesh is formed from stainless steel wire), the rock-piece filling of the cells allows the erosion prevention system to shift and settle over time, becoming integrated with the natural environment and allowing vegetation and granular material such as sand to build up and complement the structure.

Optionally, the erosion prevention system additionally comprises at least one scour prevention layer disposed below the cells. Optionally, the scour protection layer comprises a geotextile material. For example, such a geotextile material may be sandwiched between the cells and the surface of ground requiring erosion prevention. It will be appreciated that one or more additional structures may be positioned between the scour prevention layer and the ground. For example, the erosion prevention system may be laid over the top of pre-existing erosion control structures such as one or more geotubes. It has been found that incorporating a layer of geotextile material below the cells of the erosion prevention system can help to avoid ground being scoured from under the cells when water flows through and/or over the cells. Although water permeable geotextile materials allow water to pass through, large volumes of water falling on a geotextile material tend to flow across rather than through the geotextile, diverting water away from the ground under the cells without washing ground material, such as soil, sand or small rock and shingle away. Water permeable geotextile material may be woven or needle punched to provide pores that allow water to pass through.

Optionally, the erosion prevention system comprises a water barrier layer disposed below the cells. Optionally, the water barrier layer comprises a semi-permeable or impermeable barrier material. Optionally, the barrier material comprises an impermeable geotextile material. Additionally or alternatively, the water barrier comprises a clay layer, such as a clay layer sandwiched between layers of geotextile material. An example of a suitable clay is bentonite. The geotextile material used in combination with a clay layer may itself be water permeable. It has been found that a water barrier layer is particularly useful when the erosion prevention system is used in watercourses, such as rivers or canals. In such settings, the erosion prevention system provides a dual function of protecting banks from erosion while also water-proofing the lining of the watercourse.

When a geotextile material layer is incorporated into the erosion prevention system, any suitable geotextile material may be used. For example, polymeric materials such as a polyolefin, e.g. polypropylene, or polyester based material. Optionally, the geotextile material is a water permeable geotextile. Water permeable geotextile materials are fabrics that can be used to retain soil, sand, small rock or shingle, or other fine material, while allowing water to pass through. Impermeable geotextile materials are fabrics that prevent passage of water therethrough. Suitable geotextile materials are available from Geosynthetics®.

Optionally, each cell comprises a water permeable fines barrier for preventing passage of granular material therethrough, such as soil and/or sand. Optionally, the fines barrier is configured for retention of granular material having a diameter of less than 5 mm, such as less than 2 mm, for example less than 1 mm. Optionally, the fines barrier is configured to retain granular material having a diameter of at least 0.07 mm, such as at least 0.1 mm. Optionally, the fines barrier allows smaller material to pass through. Thus, the fines barrier may be a soil and/or sand barrier, and optionally not a silt barrier. When present, the fines barrier is located inside the cell, extending across the entire cross-section of the cell at a position intermediate the top and bottom of the cell. Accordingly, the optional fines barrier is disposed below the lid panel of each cell. Preferably, when present, the fines barrier is positioned immediately beneath the lid panel at the top of the cell, thereby lining the top of the adjacent lid panel. It has been found that a fines barrier can be used to help retain granular material such as sand and/or soil in the cell. A sand and/or soil containing cell may optionally contain rock pieces as well as sand and/or soil, depending on the requirements at the site requiring erosion prevention. Optionally, each cell contains granular material such as sand and/or soil, and optionally rock pieces, such as rock pieces having a cross-sectional size in all dimensions larger than the cross-sectional size of the wire mesh openings, wherein the granular material is disposed below, or located in a space enclosed by, the fines barrier. It will be appreciated that when a fines barrier is in the form of a layer extending across the cell towards the top, fines may be disposed below the barrier. When the fines barrier is, for example, in the form of a bag, fines may be located in a space enclosed by the fines barrier (thus inside the bag). Optionally, the fines barrier lines the at least three sides of said cell adjacent the side panels, and optionally the bottom of said cell adjacent the bottom panel. A fines barrier lining the top, bottom and sides of the cell may help to prevent granular material moving between cells, which over time could lead to a concentration of fines in localised parts of the erosion prevention system. Optionally, the fines barrier is in the form of a bag having a bottom lining the bottom of said cell, sides lining the at least three sides of said cell, and a top flap lining the top of said cell. A bag has been found to be particularly convenient to position in the cell and fill with material once in place. Preferably, the lid is sized and configured to overlap the sides of the bag, for example by at least 150 mm, such as at least 200 mm, for example at least 250 mm, on each side. Optionally, the lid is larger than the top of the cell, so that the edges of the lid can be pushed down alongside the sides. Additionally or alternatively, the sides of the bag are taller than the sides of the cell so that they can be folded over the top of the cell. Preferably, the fines barrier is formed from a biodegradable material, such as a synthetic or natural biodegradable material. Suitable synthetic biodegradable materials include biodegradable plastics. Preferred are natural biodegradable materials, which typically have a lower environmental impact. Suitable natural biodegradable materials include jute fibre, hemp fibre, coconut fibre, straw and sheep wool. Optionally, the biodegradable material comprises sheep wool. Optionally, each cell comprises a plurality of live plants, such as live grass plants, and/or plant seed, such as grass seed. It will be appreciated that the choice of live plants depends on the environment in which the system is located. Especially useful plants are those that are capable of establishing extensive root systems in a relatively short time. Extensive root systems are thought to help stabilise installations, for example helping to establish artificial sand-dunes and/or riverbanks. When the cells comprise live plants, the live plants are preferably positioned with roots disposed at least partially below, or located in a space enclosed by, the fines barrier. It will be appreciated that, for example, such roots may be so disposed or located initially, while over time roots may penetrate the barrier as the plants grow. Preferably, the fines barrier is configured to allow roots to penetrate the barrier. Examples of suitable plants include herbs and grasses, such as *ammophila* (a genus of grasses know as *marram* grass). Optionally, the fines barrier includes a plurality of openings into which live plants can be inserted, preferably slit openings. Such slit openings may provide a convenient way for plants to be added to cells after they have been filed and closed. When the cells comprise plant seed, the seed is preferably disposed below the fines barrier. Additionally or alternatively, seeds may be incorporated in the fines barrier itself, for example wherein the fines barrier is impregnated with seed. Providing plants and/or seed in the erosion prevention system stimulates the formation of a natural protective covering over the erosion prevention system. When a biodegradable fines barrier is utilised, the fines barrier acts to retain granular fill while plants are establishing, so that by the time the barrier naturally decays, the plants take over the role of retaining granular material in the cells. Such a system is particular effective for promoting formation of sand dunes in environmentally sensitive sites. When an erosion prevention system comprises a combination of a stainless steel wire mesh, natural biodegradable fines barrier and live plant/plant seed incorporation, the system provides an especially environmentally friendly, long-lasting form of erosion barrier.

Optionally, the erosion prevention system comprises a toe section and an incline section, wherein the toe section comprises at least one upper row of cells stacked directly on top of at least one lower row of cells, and the incline section comprises at least a first row of cells arranged alongside, and optionally at least a second row of cells arranged alongside the first row of cells. Preferably, the erosion prevention system is configured for installation on a slope so that, when installed on the slope, the stacked rows of cells forming the toe section extend across the base or a lower part of the slope, and each row of cells forming the inclined section extends across the slope above the toe section. It has been found that a stacked toe section helps provide additional mass at the base of a slope, improving overall stability of the erosion prevention system. More particularly, it has been found that having a greater mass in the toe section encourages the toe section to dip downwards into the ground if the ground under the toe section is eroded. Especially when installed in a coastal location, the ground under the toe section is often most susceptible to undermining as it is usually most exposed to wave action. Dipping of the toe section into the ground helps the erosion protection system bury itself and avoid future undermining, and also helps increase tension across the cells thereby increasing strength and rigidity of the system as a whole. Preferably, each cell in the upper row of the toe section is secured to at least one cell in the incline section by a lid panel and/or a base panel, wherein each cell in the toe section is secured to another cell in the same row of the toe section by a base panel or a lid panel. Preferably, each cell in the incline section is secured 1) to another cell in the same row of the incline section by a base panel or a lid panel, and 2) to another cell in a different row of the incline section and/or to another cell in the upper row of the toe section by a lid panel or a base panel. The lid and/or base panel interconnections provides an especially robust connection between cells, helping the system to act as a monolithic slab. Optionally, the erosion prevention system additionally comprises a head section, wherein the head section comprises at least one upper row of cells stacked above at least one lower row of cells. Preferably, the erosion prevention system is configured so that, when installed on the slope, the stacked rows of cells forming the head section extend across the top or a higher part of the slope, and each row cells forming the inclined section extends across the slope below the head section. Optionally, each cell in the upper row of the head section is secured to at least one cell in the incline section by a lid panel and/or a base panel, wherein each cell in the head section is secured to another cell in the same row of the head section by a base panel or a lid panel, and wherein each cell in the incline section is secured 1) to another cell in the same row of the incline section by a base panel or a lid panel, and 2) to another cell in a different row of the incline section and/or to another cell in the upper row of the head section by a lid panel or a base panel. It has been found that a stacked head section can also improve overall stability of the erosion prevention system by providing an anchor point above the incline section. Optionally, the incline section comprises one or more additional rows of cells stacked on top of the at least two rows of cells. Preferably, when the incline section comprises such vertically stacked rows of cells, the toe section (and the head section, if present) comprises at least one more layer of cells than present on the incline section. For example, if the incline section comprises two layers of stacked cells, the toe section preferably comprises at least three layers. Preferably, when multiple layers of cells are present, cell bracing assemblies, if present, span all vertically stacked layers, thereby compressing the cells together. Preferably, when the erosion prevention system comprises stacked layers of cells, the base panels of the cells of the upper layer form the lid panels of the cells of the lower layer. Alternatively, lower layers of cells are provided with lid panels separate to the base panels of upper layers of cells. Optionally, the cells in stacked layers are arranged in an offset pattern, for example so that one cell does not align exactly with a cell directly above or below it. It will appreciated that when the erosion prevention system comprises multiple layers of cells, fines barriers and/or live plants/plat seeds may for example be included only in the cells of the top layer of each section.

Optionally, each cell has a length of 2-4 m. Optionally, each cell has a width of 2-4 m. Optionally, each cell has a height of 0.7-1 m. Optionally, each cell has an internal volume of 2.8-16 $m^3$. Optionally, the base panel is formed from a continuous sheet of wire mesh (e.g. a portion of such a sheet of wire mesh) having a width of 1-5 m, such as 2-4 m, and a length of 20-50 m, such as 25-35 m. It will be appreciated that such a base panel optionally defines the bottom of multiple cells, for example at least five cells, such as at least 10 cells. Alternatively, the base panel is a sheet of wire mesh having a width of 1-5 m, and a length of 1-5 m. It will be appreciated that such a base panel optionally defines the bottom of a single cell. Optionally, the lid panel is formed from a continuous sheet of wire mesh (e.g. a portion of such a sheet of wire mesh) having a width of 1-5 m, such as 2-4 m, and a length of 20-50 m, such as 25-35 m. It will be appreciated that such a lid panel optionally defines the top of multiple cells, for example at least five cells, such as at least 10 cells. Alternatively, the lid panel is a sheet of wire mesh having a width of 1-5 m, and a length of 1-5 m. It will be appreciated that such a lid panel optionally defines the top of a single cell. Preferably, when the lid panel defines the top of a single cell, the base panel defines the bottoms of multiple cells. Alternatively, when the base panel defines the bottom of a single cell, the lid panel defines the tops of multiple cells. Preferably, the lid panel defines the top of multiple cells and the base panel defines the bottom of a single cell. It is believed to be particularly convenient to draw a sheet over multiple cells to define the tops of multiple cells.

Optionally, the erosion prevention system comprises a first layer of cells stacked above a second layer of cells. Optionally, in such an arrangement, the lid panels of a lower layer of cells may form the base panels of an upper layer of cells stacked immediately on top of the lower layer of cells. Alternatively, the lid panels of a lower layer of cells may be separate to the base panels of an upper layer of cells stacked immediately on top of the lower layer of cells.

It will be appreciated that the erosion prevention system may optionally comprise additional cells different to the first, second, third, fourth and fifth cells described herein above. For example, the erosion prevention system may additionally comprise one or more cells having a structure and/or arrangement different to the cells described herein above. In particular, cells at the periphery of the erosion prevention system may optionally have a structure different to that of cells located in the interior of the system. Additionally or alternatively, the erosion prevention system may optionally include multiple layers, including a layer of cells having a structure and arrangement different to the cells described herein above. Alternatively, all cells of the erosion prevention system are structured and arranged as described herein above.

According to a sixth aspect of the invention, there is provided a cell portion for an erosion prevention system. It will be appreciated that the cell portion is identifiable as an individual portion, not attached to other cells. For example, the cell portion according to the sixth aspect of the invention is an individual cell portion separable from, or separate to, any other cell portions. The cell portion comprises at least three side panels upstanding from a base panel. It will be understood that the cell portion may be in the form of an open-topped cell. The side panels and the base panel are each formed from wire mesh and fastened together at cell edges. At least one of the side panels is spaced inwards from a peripheral edge of the base panel by at least 150 mm, such as at least 200 mm, for example at least 250 mm. The base panel extends at least 150 mm, such as at least 200 mm, for example at least 250 mm, beyond at least one side of the cell portion. Additionally or alternatively, the base panel extends outwards from at least one side of the cell portion by at least 5%, such as at least 7%, for example at least 10%, of the width of the cell portion measured between said side and an opposed side or edge. Preferably, the base panel of the cell portion is configured to extend below and overlap the base panel defining the bottom of an adjacent portion by at least 150 mm, such as at least 200 mm, for example at least 250 mm. Optionally, the cell portion comprises at least four side panels upstanding from the base panel, and at least two of the side panels are spaced inwards from the peripheral edge of the base panel by at least 150 mm, such as at least 200 mm, for example at least 250 mm. The base panel may thus extend at least 150 mm, such as at least 200 mm, for example at least 250 mm, beyond at least two sides of the cell portion. Preferably, the base panel is configured to extend below and overlap the base panel defining the bottom of an adjacent cell portion by at least 150 mm, such as at least 200 mm, for example at least 250 mm. Optionally, the base panel extends outwards from at least two sides of the cell portion by at least 5%, such as at least 7%, for example at least 10%, of the width of the cell portion measured between the side from which the panel extends and an opposed side or edge. Optionally, the base panel extends from opposed sides. Additionally or alternatively, the base panel extends from adjacent sides, in other words, sides that share a common edge. Optionally, each cell portion has X upstanding side panels, wherein X/2 of the upstanding side panels are spaced inwards from the peripheral edge of the base panel by at least 150 mm, such as at least 200 mm, for example at least 250 mm, and X/2 of the upstanding sides are positioned at the peripheral edge of the base panel. Optionally, the base panel extends outwards from X/2 sides of the cell portion by at least 5%, such as at least 7%, for example at least 10%, of the width of the cell portion measured between the side from which the panel extends and an opposed side or edge, and the base panel terminates at X/2 sides of the cell portion. Optionally X is 4 or 6, for example 4. Optionally, when X=4, the base panel extends from opposed sides or from adjacent sides (in other words sides that share a common edge), preferably from adjacent sides. Optionally, when X=6, the base panel extends from alternating sides. Optionally, the cell portion is an extended base cell portion, having all side panels so spaced inwards from the peripheral edges of the base panel, and/or wherein the base panel so extends outwards from all sides of the cell portion. The base panel may be the same overall shape as the bottom of the cell portion, or a different shape. For example, the base panel extensions may be in the form of flaps (a flap for each side of the cell portion), or the base panel may extend outwards from the vertices at the bottom of the cell portion as well as from the edges at the bottom of the cell portion. Optionally, the extended base cell portion is configured to work in tandem with a cropped base cell portion, which has all said side panels positioned at the peripheral edges of the base panel, and/or a base panel that terminates at each side of the cell portion. When assembled together, each side of an extended base cell portion that abuts another cell should abut a side of a cropped base cell, and each side of a cropped base cell that abuts another cell should abut a side of an extended base cell.

Optionally, the base and side panels are fastened together at the cell edges by one or more tie wires and/or a plurality of clips, for example as described below in relation to the fifth aspect of the invention. Optionally, the wire mesh, and/or the tie wires/clips if present, are formed from high tensile wire, as described above in relation to the fifth aspect of the invention. Preferably, the cell portion is suitable for forming at least part of some cells of the erosion prevention system of the fifth aspect of the invention. Accordingly, the cell portion of the sixth aspect of the invention may incorporate any feature of the cell of the erosion prevention system of the fifth aspect of the invention, including for example cell arrangement, construction and assembly details.

According to a seventh aspect of the invention, also provided is a kit of parts for forming the cell portion according to the sixth aspect of the invention. The kit of parts comprises a base panel and at least three side panels of wire mesh configured to define the bottom and sides of the cell portion, and a plurality of fastenings for fastening together the base panel and the side panels.

According to an eighth aspect of the invention, also provided is a kit of parts for forming the erosion prevention system of the fifth aspect of the invention. The kit of parts comprises a plurality of base panels, side panels and lid panels of wire mesh configured to define the bottoms, sides and tops of the cells of the erosion prevention system, and a plurality of fastenings for fastening together the base, side and lid panels, optionally wherein the kit of parts comprises the kit of parts of the seventh aspect of the invention.

Optionally, the kit of parts comprises a plurality of brace assemblies for tying the base panel of each cell to the lid panel of each cell. Optionally, each brace assembly comprises a lower brace plate configured for disposal below said base panel, an upper brace plate configured for disposal above said lid panel, and a tensioning cable for joining the lower brace plate to the upper brace plate. It will be appreciated that such brace assemblies may also be suitable for tying a first side panel of each cell to a second opposed side panel. For example, one or more brace assemblies may comprise a first brace plate configured for disposal outside said first side panel, a second brace plate configured for disposal outside said second side panel, and a tensioning cable for joining the first brace plate to the second brace plate. Optionally, the kit of parts comprises a plurality of vertical and/or horizontal brace assemblies. Optionally, the brace assembly is as described in relation to the fifth aspect of the invention.

Optionally, the kit of parts comprises a plurality of fines barriers, for example as described in relation to the fifth aspect of the invention. For example, the fines barrier may take the structure and/or form, and be formed from the material described in relation to the fifth aspect of the invention.

Optionally, the kit of parts comprises a scour prevention layer for disposal below the cells, for example as described in relation to the fifth aspect of the invention. For example, the scour prevention layer may take the structure and/or form, and be formed from the material described in relation to the fifth aspect of the invention.

It will be appreciated that the kit of parts optionally comprises any component described in relation to the fifth aspect of the invention.

According to a ninth aspect, there is provided a method of installing an erosion prevention system, such as according to the fifth aspect of the invention. The method preferably comprises assembling and fastening together base panels and side panels along cell edges to define the bottoms and sides of the plurality of cells, thereby forming a plurality of cell portions. The cell portions are preferably secured together by fastening the base panel of each first cell to at least three sides of an adjacent second cell, for example along edges of the adjacent second cell, and/or to another base panel defining the bottom of the adjacent second cell. It will be appreciated that the step of securing together the cell portions may be performed during or after the step of forming the cell portions. Next, fill material may be inserted into the cell portions. Optionally, the fill material so inserted comprises rock material having a cross-sectional size in all dimensions larger than the cross-sectional size of the wire mesh openings. Optionally, further fill material is added to the cells after the step of closing the cell portions, such as rock pieces sized to pass through the mesh openings and/or granular material. Following insertion of at least some fill material, the method preferably comprises closing the plurality of cell portions by securing lid panels to the cell portions. Preferably, the step of securing the lid panels comprises arranging a plurality of lid panels so that each of the lid panels extends across at least a portion of the top of a first cell (e.g. entirely across) and across at least a portion of a third cell adjacent the first cell (e.g. entirely across), and fastening each of said lid panels to other panels of the first and third cells. Optionally, the method comprises fastening each of said lid panels to: a) at least two side panels, such as at least three side panels, for example all side panels, of said first cell and to at least two side panels, such as at least three side panels, for example all side panels of said adjacent third cell, for example along cell edges, and/or b) another lid panel extending across at least a portion (e.g. entirely across) the top of said adjacent third cell. Thus, each lid panel is preferably secured to at least three sides of an adjacent cell, e.g. along edges of the adjacent cell, and/or to another lid panel defining the top of the adjacent cell.

Optionally, prior to the step of securing together the cell portions, the method comprises laying a scour prevention layer, and/or a water barrier layer on ground requiring erosion protection, and then arranging the cell portions on top. Optionally, the method comprises grading the ground to be protected before laying down a scour protection layer/water barrier layer (if present) and securing together the cell portions on the ground.

Optionally, the method comprises installing at least part of one or more bracing assemblies into each cell portion before the step of inserting fill material into the cell portions, and completing the bracing assemblies after the step of closing the plurality of cell portions to tie the base panel to the lid panel of each cell. The bracing assembly may be as described in relation to the fifth aspect of the invention. Optionally, the step of completing the bracing assemblies comprises tensioning the cable while pushing the upper bracing plate towards to the lower bracing plate, and securing a clip to the cable to retain the upper bracing plate in position, optionally wherein the method comprises drawing the wire through a one-way clip.

Optionally, the method comprises inserting into each cell portion a water permeable fines barrier for preventing passage of granular material therethrough, either immediately before, during, or immediately after the step of inserting fill material into said cell. Optionally, the fines barrier is as described in relation to the fifth aspect of the invention. Optionally, each fines barrier is in the form of a bag, wherein the method comprises inserting each fines barrier into a cell portion before the step of inserting fill material, arranging the bag so that the bottom and sides of the bag line the bottom and sides of the cell portion, filling each bag with fill material thereby inserting fill material into the cell portions, and closing the top flap of the bag over the fill material before the step of closing the plurality of cell portions. Optionally, the step of closing the top flap comprises overlapping the top flap with the sides of the bag. Optionally, the method comprises 1) adding plant seed to the fill material; and/or 2) inserting the roots of a plurality of live plants, such as live grass plants, and/or plant seed, such as grass seed, through openings in the top of the fines barrier. Optionally, live plants and/or plant seed are so inserted before or after the step of closing the plurality of cell portions, preferably after. The live plants/seeds may be as described in relation to the fifth aspect of the invention.

Optionally, the method comprises so assembling and securing together a first layer of cell portions, filling the cell portions with fill material, and adding a further layer of cell portions on top of the first layer. Optionally, the method comprises securing the bottom panels of an upper layer of cell portions over the top of the lower layer to form the lid portions of the lower layer. It will be appreciated that such steps are repeatable for as many layers as required.

According to a tenth aspect of the invention, there is provided an erosion prevention system comprising a plurality of rock and/or granular material containment cells arranged in a grid pattern, each cell having at least five faces enclosing an internal volume, the faces including a top, a bottom and at least three sides, each face being formed from at least one panel of wire mesh, the plurality of cells comprising a plurality of joining cells, wherein each joining cell has 1) an adjacent cell with a top formed only from one or more wire mesh panels separate to the at least one wire mesh panel forming the top of the joining cell, wherein at least one wire mesh panel forming the bottom of the joining cell extends across at least a portion of the bottom of the adjacent cell, or 2) an adjacent cell with a bottom formed only from one or more wire mesh panels separate to the at least one panel forming the bottom of the joining cell, wherein at least one wire mesh panel forming the top of the joining cell extends across at least a portion of the top of the adjacent cell; wherein all cells have 1) a top at least partially formed by at least one wire mesh panel that forms at least part of the top of a joining cell, or 2) a bottom at least partially formed by at least one wire mesh panel that forms at least part of the bottom of a joining cell. Optionally, all cells are joining cells. It will be understood that the erosion prevention system according to the tenth aspect of the invention may incorporate any feature described in relation to the fifth aspect of the invention. For example, the cells may be constructed and arranged as described in relation to the fifth aspect of the invention. In particular, the wire mesh forming the wire mesh panels is optionally formed from high tensile steel wire, and/or is woven or knitted wire mesh, such as chain-link wire mesh. By way of further examples, it will be understood that the erosion prevention system of the tenth aspect of the invention may comprise the bracing assemblies, scour prevention layer, water barrier layer, and/or fines barrier described in relation to the fifth aspect of the invention. It will further be understood that the erosion prevention system of the tenth aspect of the invention may be assembled from the cell portions of the sixth aspect of the invention and/or the kit of parts of the seventh or eighth aspects of the invention, and/or constructed according to the method of the ninth aspect of the invention.

It will be understood that any aspect of the invention may optionally incorporate any feature described in relation to another aspect of the invention. For example, the base panel and at least one side panel of the cells/cell portions of the sixth, seventh, eighth, ninth and tenth aspects of the invention may optionally be formed from a continuous length of wire mesh, as described in relation to the first, second, third and fourth aspects of the invention. Optionally, the top panel of said cells/cell portions may also be formed from the continuous length of wire mesh forming the bottom panel and at least one side panel. Similarly, the wire mesh panels forming the base and at least one side (and optionally the top) of the cells of the sixth aspect of the invention may optionally be formed from a continuous length of wire mesh, as described in relation to the first, second, third and fourth aspects of the invention. Furthermore, it will be understood that the cell assembly of the first aspect of the invention may optionally form part of a stack of cells, e.g. wherein the cell assembly is placed on top of a stack of cells where the top of each cell in layers below the top layer of the stack is closed by the mesh forming the bottom of the cell immediately above. Similarly, it will be appreciated that the cell assembly may optionally include multiple layers of stacked cells, for example wherein the continuous length of mesh defining the lower and upper faces of the cell assembly form the bottom of any cell(s) at the bottom of the stack and the top of any cell(s) at the top of the stack.

DESCRIPTION OF THE DRAWINGS

Embodiments of the present invention will now be described by way of example only with reference to the accompanying schematic drawings of which:

FIG. 3a shows a cross-sectional, side view of the erosion prevention system of FIG. 2a;

FIG. 3b shows an enlarged view of the cell arrangement in the system of FIG. 2a;

FIG. 4a shows a cross-sectional, side view of a double-layer erosion prevention system;

FIG. 4b shows an enlarged view of the cell arrangement in the system of FIG. 4a;

FIG. 5a shows a cross-sectional, side view of another erosion prevention system;

FIG. 5b shows an enlarged view of the cell arrangement in the system of FIG. 5a;

FIG. 6a shows a perspective view of a cell portion for forming the system of FIG. 2a;

FIG. 6b shows a plan view of the cell of FIG. 6a;

FIG. 7a shows a perspective view of another cell portion for forming the system of FIG. 2a;

FIG. 7b shows a plan view of the cell of FIG. 7a;

FIG. 8a shows a perspective view of another cell portion for forming the system of FIG. 2a;

FIG. 8b shows a plan view of the cell of FIG. 8a;

FIG. 9a shows a perspective view of another cell portion for forming the system of FIG. 2a;

FIG. 9b shows a plan view of the cell of FIG. 9a;

FIG. 10a shows a perspective view of a cell portion for forming the system of FIG. 2a;

FIG. 10b shows a plan view of the cell of FIG. 10a;

FIG. 12 shows a perspective view of the cell arrangement in the system of FIG. 2a;

FIG. 13b shows a plan view of the cell of FIG. 13a;

FIG. 15b shows a plan view of the cell of FIG. 15a;

FIG. 16a shows a top plan view of a wire mesh for use in the system of FIG. 2a;

FIG. 16b shows a side view of the wire mesh of FIG. 16a;

FIG. 17c shows a spring clip 1703 suitable for fastening together panels of wire mesh;

FIG. 20 shows a row of three cell portions of FIG. 18 arranged side by side;

FIG. 21a shows the fines barrier bag of FIG. 18 before insertion into a cell portion;

FIG. 21b shows the bag of FIG. 21a with the top flap closed and folded down;

FIG. 22a shows a perspective view of a cell assembly according to the first aspect of the invention;

FIG. 22b shows a plan view of the cell of FIG. 22a;

FIG. 23a shows a perspective view of another cell assembly according to the first aspect of the invention;

FIG. 23b shows a plan view of the cell of FIG. 23a;

DETAILED DESCRIPTION

Figure 1A:
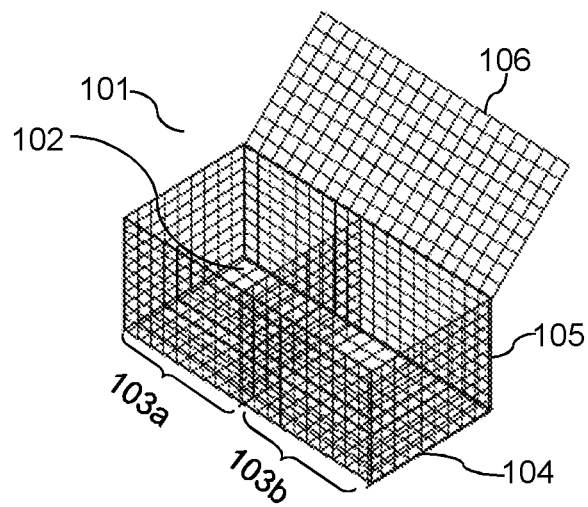
FIGS. 1a and 1b show prior art gabion designs.
Figure 1B:
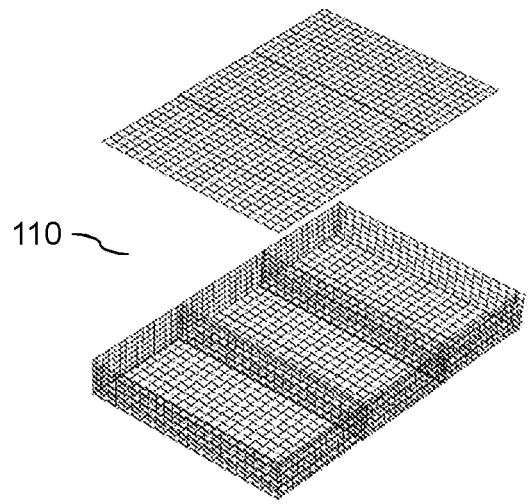
Figure 2A:
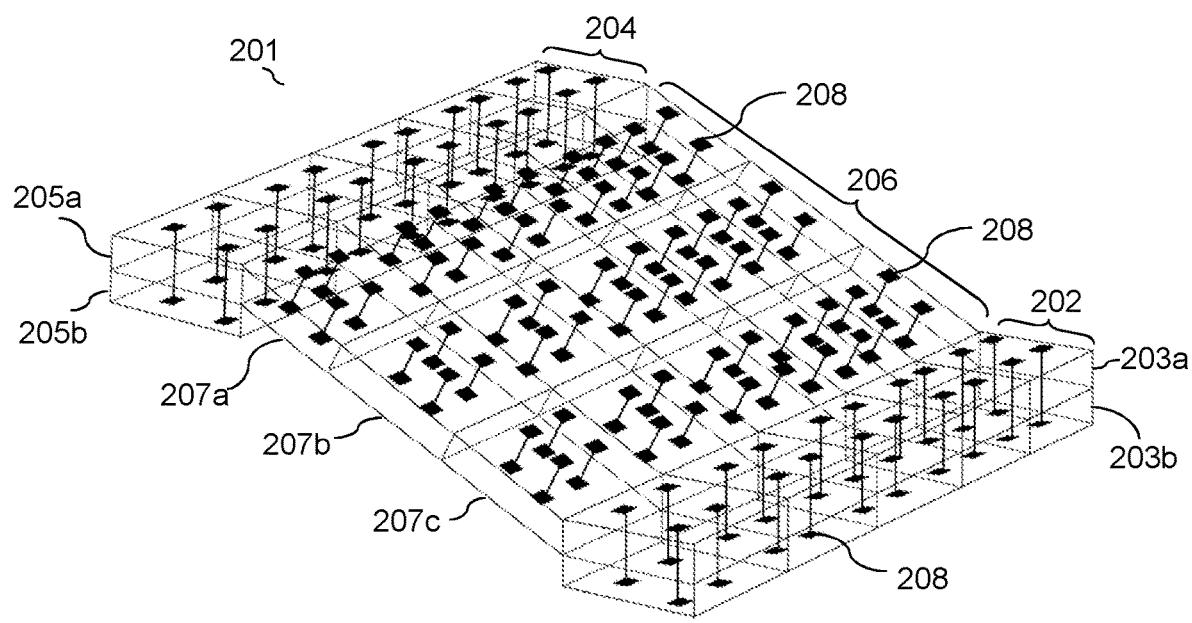
FIG. 2a shows a perspective view of an erosion prevention system according to a first embodiment of the invention.

FIG. 2a shows a perspective view of an erosion prevention system 201 according to a first embodiment of the invention. In the embodiment shown in FIG. 2a, the erosion prevention system 201 comprises a horizontal toe section 202 made up of two stacked rows of four cells (upper row 203a and lower row 203b), a horizontal head section 204 made up of two stacked rows of four cells (upper row 205a and lower row 205b), and an inclined section 206 made up of three rows 207a, 207b, 207c, of four cells arranged side by side and disposed between the toe section 202 and the head section 204. For clarity, FIG. 2a shows only the position of the bottom, sides and top of each cell, and not the position of the corresponding base panels, side panels and lid panels (which are described below by reference to the following figures). FIG. 2a also omits the rock pieces filling each cell. Each cell has a cuboid shape (thus having four sides), allowing the cells to be arranged in a grid. Each column of the grid, extending in a direction perpendicular to the rows defining the toe 202, head 204 and inclined 206 sections, comprises one upper toe cell, three side-by-side incline cells and one upper head cell. FIG. 2a also shows the position of bracing assemblies 208 extending from the top to the bottom of each cell in the incline section 206, and extending from the top of the bottom of each stacked cell pair in the toe 202 and head 204 sections. Each cell is held together by four bracing assemblies 208.

Figure 2B:
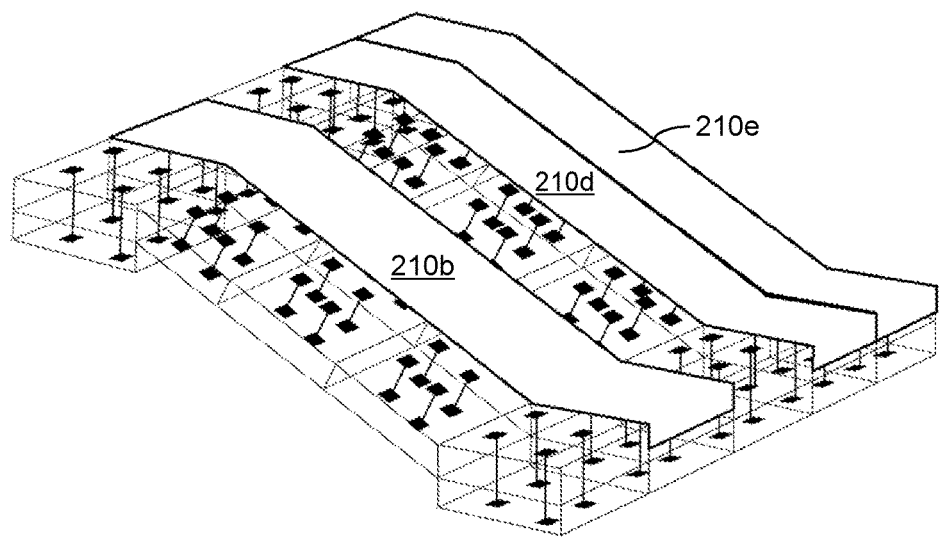
FIG. 2b shows a perspective view of the erosion prevention system of FIG. 2a with three of five lid panels added.

FIG. 2b shows the erosion prevention system 201 of FIG. 2a with three of the five lid panels 210b, 210d, 210e defining the tops of the cells. Each lid panel 210 extends along the full length of each column of cells, and overlaps the side panels of the top cells in the toe 202 and head 204 section stacked cell pairs.

FIG. 3a shows a cross-sectional, side view of the erosion prevention system 201 of FIG. 2a. Visible in FIG. 3a is one of the lid panels 210. Each lid panel 210 extends along the full length of each column of cells, and overlaps the side panels of the top cells in the toe 202 and head 204 section stacked cell pairs. For clarity, FIG. 3a shows exaggerated spacing between the lid panel 210 and the underlying cell side panels, and between the side panels of adjacent cells. When constructed, the cell side panels and the lid panel are brought into intimate contact with each other using a fixing system, which could include a flexible wire, rigid wire, c-clips, pressed claw clips or spring clips, preventing escape of rock pieces from the cells. Also visible in FIG. 3a is a scour prevention layer 211 formed of a geotextile material underlying the cells. For clarity, FIG. 3a shows exaggerated spacing between the scour prevention layer 211 and the overlying cells. When constructed, the cells can rest directly on the geotextile of the scour prevention layer 211. The erosion prevention system 201 is particularly well suited to coastal installations with exposure to moderate force wave impacts.

FIG. 3b shows an enlarged view of the cell arrangement in the inclined section 206 of the erosion prevention system 201 of FIG. 2a. As in FIG. 3a, FIG. 3b shows exaggerated spacing between adjacent cells 220a, 220b and 220c, the cells and the lid panel 210 and the cells and the geotextile layer 211. Two side panels are spaced inwards from the edge of the base panel (only one such side panel 221 is visible in FIG. 3a), leaving a section of the base panel 222 projecting out from the side of the cell. This projecting section of the base panel 222 extends under and overlaps the base of adjacent cells. The overlap is joined to the base panel of the adjacent cells by wire connection clips (not shown in FIG. 3b), providing a firm and flexible connection that results in the whole erosion prevention system behaving as a monolithic structure.

FIG. 4a shows a cross-sectional, side view of a double-layer erosion prevention system 401. The erosion prevention system 401 is similar to that of FIG. 3a, having a horizontal toe section 402 made up of three stacked rows of cells (upper row 403a, intermediate row 403b, lower row 403c), a horizontal head section 404 made up of three stacked rows of cells (upper row 405a, intermediate row 405b, lower row 405c), and an inclined section 406 made up of three upper rows of cells (407a, 407b, 407c) and three lower rows of cells (408a, 408b, 408c) arranged side by side and disposed between the toe section 402 and the head section 404. A lid panel 410 extends along the full length of each column of cells, and overlaps the side panels of the top cell in the toe 402 and head 404 section stacked cells. For clarity, as in FIG. 3a, FIG. 4a shows exaggerated spacing between the lid panel 410 and the underlying cell side panels, and between the side panels of adjacent cells. Also visible in FIG. 4a is a scour prevention layer 411 formed of geotextile material underlying the cells, again with exaggerated spacing between the scour prevention layer 411 and the overlying cells. The erosion prevention system 401 is particularly well suited to coastal installations with exposure to high force wave impacts, and/or steeper slopes.

FIG. 4b shows an enlarged view of the cell arrangement in the inclined section 406 of the erosion prevention system 401 of FIG. 4a. Again, FIG. 4b shows exaggerated spacings. The individual cells are the same as in the erosion prevention system 201 for FIGS. 2, 3a and 3b, and arranged in the same manner within each row. The upper 407 and lower 408 rows of cells are staggered, so that for example the middle upper row 407b sits partly on top of the middle lower row 408b and one of the outer lower rows 408a. Consequently, the top of each cell of the lower rows is not defined by a single lid panel 410, instead being defined by a combination of base panels of the upper row. However, the cells in the upper rows of cells have the same lid arrangement as the cells in erosion prevention system 201.

FIG. 5a shows a cross-sectional, side view of another erosion prevention system 501. The cell arrangement in the erosion prevention system 501 is the same as for the erosion prevention system 201 of FIGS. 2, 3a and 3b. Features the same as those in FIGS. 3a and 3b are given corresponding reference numerals, prefixed '5' instead of '2'. Also visible in FIG. 5a is a water barrier layer 530 formed of a layer of bentonite clay 531 sandwiched between lower 532 and upper 533 layers of geotextile material. The water barrier layer 530 is positioned under the cells, again with exaggerated spacing between the overlying cells. In the installation shown in FIG. 5a, which can be used to line the side of a watercourse, the head section 504 is cut into the top of the existing watercourse bank 540, with the water barrier 530 extending up the outside of the head section 504. As shown in FIG. 5a, the top of the head section 504 lies in the same plane as the top of the watercourse bank 540.

FIG. 5b shows an enlarged view of the cell arrangement in the inclined section 506 of the erosion prevention system 501 of FIG. 5a. Those parts of the erosion prevention system 501 shown in FIG. 5b are labelled with the same reference numerals as used in FIG. 5a.

FIG. 6a shows a perspective view of a cell portion 601 suitable for forming the erosion prevention systems 201, 401, 501 of any of FIG. 3a, 4a or 5a. The cell portion 601 has a base panel 602 joined to four upstanding side panels 603a-d by wire fastenings (not shown in FIG. 6a). Optionally, the side panels 603a-d could be formed from a single sheet of mesh, with bends at the edges between panels and with a join to close the sides, e.g. between panels 603a and 603d. Joins between panels are formed using rigid helicoil fastening wires, although flexible wire or wire loop (e.g. c-clip, pressed claw clip or spring clip) fastenings could be used. Side panel 603d is spaced inwards of the edge 603e of the base panel, thereby allowing a section 602f of the base panel 602 to extend beyond the side of the cell. Although no lid panel is shown in FIG. 6a, a set of four bracing assemblies 610 are shown to give an indication of their positions once the cell is assembled. The panels of the cell are formed from a diamond pattern wire mesh, shown only on side panel 603a for clarity. Other mesh shapes could be used. The diamond shaped openings of the mesh have lengths greater than their widths, forming an elongate diamond. The mesh is oriented with the length axis of the diamonds parallel the bottom of the cell portion, although other orientations could be used.

FIG. 6b shows a plan view of the cell portion 601 of FIG. 6a. The plan view clearly shows the arrangement of the side panels 603a-d on the base panel 602, and the positioning of the four bracing assemblies 610 in the cell.

FIG. 7a shows a perspective view of another cell portion 701 suitable for forming the erosion prevention systems of any of FIG. 2a, 3a, 4a or 5a. The cell portion 701 is similar to the cell portion 601 of FIG. 6a, and features corresponding to those of FIG. 6a are labelled with the same reference numerals as used in FIG. 6a, prefixed '7' rather than '6'. The cell portion has two side panels 703c, 703d spaced inwards of the edge 702e of the base panel 702 thereby allowing a section 702f of the base panel 702 to extend beyond two sides of the cell. The two inset side panels 703c, 703d are adjacent sides that share a vertical edge of the cell. FIG. 7b shows a plan view of the cell of FIG. 7a. The plan view clearly shows the arrangement of the side panels 703a-d on the base panel 702, and the positioning of the four bracing assemblies 710 in the cell.

Figure 8A:
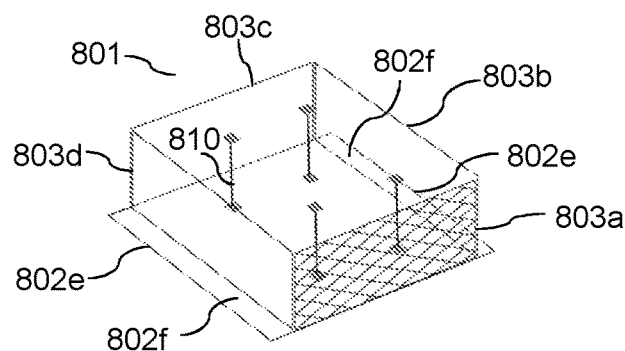
Figure 8B:
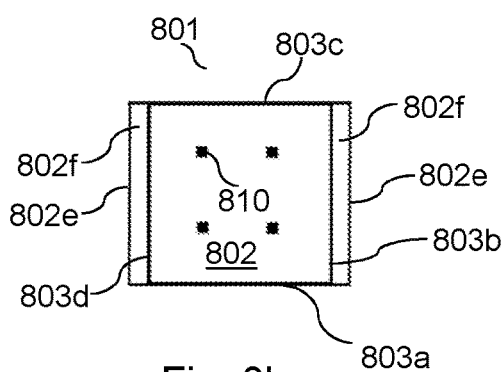

FIG. 8a shows a perspective view of another cell portion 801 suitable for forming the erosion prevention systems of any of FIG. 3a, 4a or 5a. The cell portion 801 is very similar to the cell portion 701 of FIG. 7a, except that the inward spaced side panels 803b, 803d are opposed sides of the cell that do not share a vertical edge. Instead, the inward spaced side panels 803b, 803d are separated by side panels 803a, 803c that are positioned at the edge 802e of the base panel 802. Features corresponding to those of FIG. 7a are labelled with the same reference numerals as used in FIG. 7a, prefixed '8' rather than '7'. FIG. 8b shows a plan view of the cell of FIG. 8a. The plan view clearly shows the arrangement of the side panels 803a-d on the base panel 802, and the positioning of the four bracing assemblies 810 in the cell.

Figure 9A:
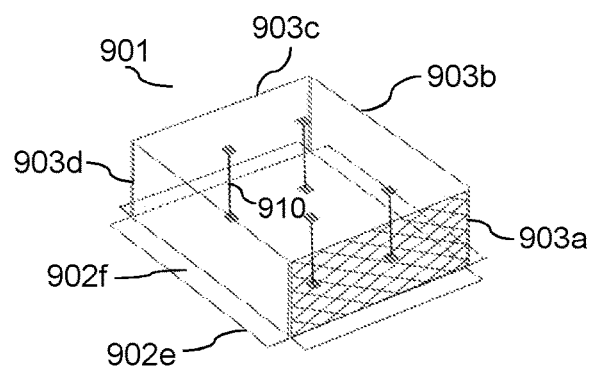
Figure 9B:
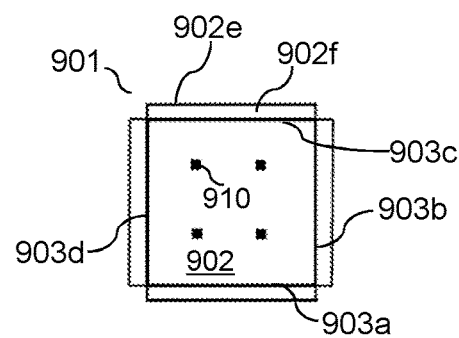

FIG. 9a shows a perspective view of another cell portion 901 suitable for forming the erosion prevention systems of any of FIG. 3a, 4a or 5a. The cell portion 901 is similar to the cell portion 601 of FIG. 6a, and features corresponding to those of FIG. 6a are labelled with the same reference numerals as used in FIG. 6a, prefixed '9' rather than '6'. The cell portion has all four side panels 903a-d spaced inwards of the edge 902e of the base panel 902 thereby allowing sections 902f of the base panel 902 to extend beyond four sides of the cell. The extending sections 902f of the base panel are in the form of flaps that extend out from the sides of the cell, so that the edge 902e terminates at the vertices at the base of the cell. The overall shape of the base panel 902 is square with square cut-outs at the corners. FIG. 9b shows a plan view of the cell of FIG. 9a. The plan view clearly shows the arrangement of the side panels 903a-d on the base panel 902, and the positioning of the four bracing assemblies 910 in the cell. When used to form an erosion prevention system, each cell portion 901 (which is an 'extended base' cell portion) should be surrounded by four 'cropped base' cell portions, such as that shown in FIG. 11. A cropped base cell portion should adjoin each of sides 903a-d of extended base cell portion 901. The extended and cropped base cell portions should be arranged in a checkerboard pattern.

Figure 10A:
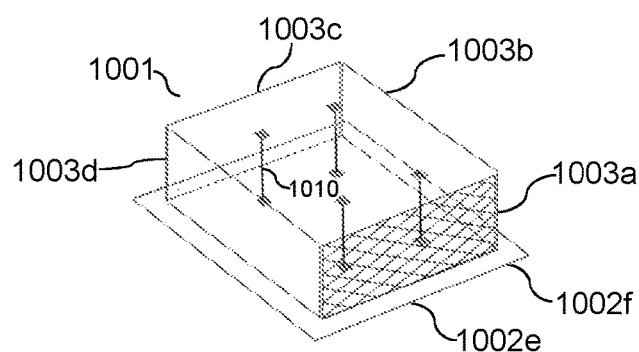
Figure 10B:
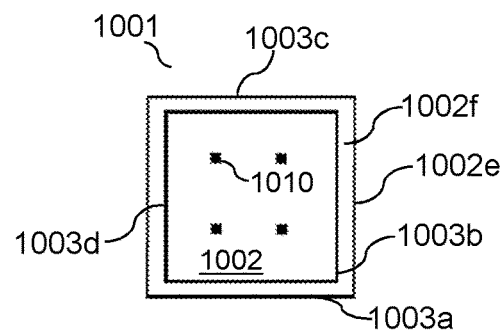

FIG. 10a shows a perspective view of another cell portion 1001 suitable for forming the erosion prevention systems of any of FIG. 3a, 4a or 5a. The cell portion 1001 is similar to the cell portion 601 of FIG. 6a, and features corresponding to those of FIG. 6a are labelled with the same reference numerals as used in FIG. 6a, prefixed '10' rather than '6'. The cell portion has all four side panels 1003a-d spaced inwards of the edge 1002e of the base panel 1002 thereby allowing sections 1002f of the base panel 1002 to extend beyond four sides of the cell. The base panel 1002 has the same shape as the bottom of the cell (but larger), and so extending section 1002f extends the whole way around the cell, so that the vertices at the base of the cell are also spaced inwards from the edge 1002e. FIG. 10b shows a plan view of the cell of FIG. 10a. The plan view clearly shows the arrangement of the side panels 1003a-d on the base panel 1002, and the positioning of the four bracing assemblies 1010 in the cell. When used to form an erosion prevention system, each cell portion 1001 (which is an 'extended base' cell portion) located in the interior of the erosion prevention system (i.e. not at the periphery) should be surrounded by eight 'cropped base' cell portions, such as that shown in FIG. 11. Four cropped base cell portions should adjoin sides 1003a-d of extended base cell portion 1001, and four should adjoin the corners between the sides 1003a-d. Thus, the extended and cropped base cell portions should be arranged with each extended base portion surrounded by a ring of cropped base cell portions. It will be appreciated the arrangement may differ at the periphery of the system.

The cell portions of FIGS. 6a-10a are each suitable for defining the bottom and sides of a cell having a width of 3.25 m, a length of 3.25 m and a height of 0.75 m. The base panel extends from the side(s) of the cell portion by 0.25 m so that it can overlap the base of an adjacent cell by 0.25 m. The wire mesh forming the panels is Geobrugg® TECCO® high-tensile steel wire mesh G65/3 stainless, having a wire diameter of 3.0 mm, and a wire tensile strength of at least 1,650 N/mm$^2$, formed from AISI 318 stainless steel. The mesh tensile strength is at least 140 kN/m. The diamond openings are 143 mm long, and 83 mm wide. Other wire meshes could be used, including Al/Zn coated steel wire mesh, such as other Geobrugg® TECCO® mesh products.

Figure 11:
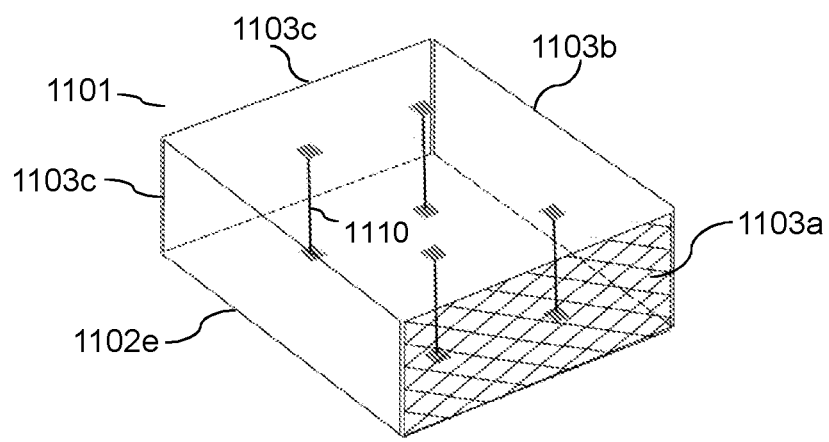
FIG. 11 shows a perspective view of a cropped base cell portion suitable for use with the cell portions of FIGS. 9 and 10.

FIG. 11 shows a perspective view of a cropped base cell portion suitable for use with the extended base cell portions 901, 1001 of FIGS. 9 and 10. The cell portion 1101 is very similar to the cell portion 601 of FIG. 6a, except that all sides 1103a-d are positioned at the edge of the base panel. Features corresponding to those of FIG. 6a are labelled with the same reference numerals as used in FIG. 6a, prefixed '11' rather than '6'.

Figure 12:
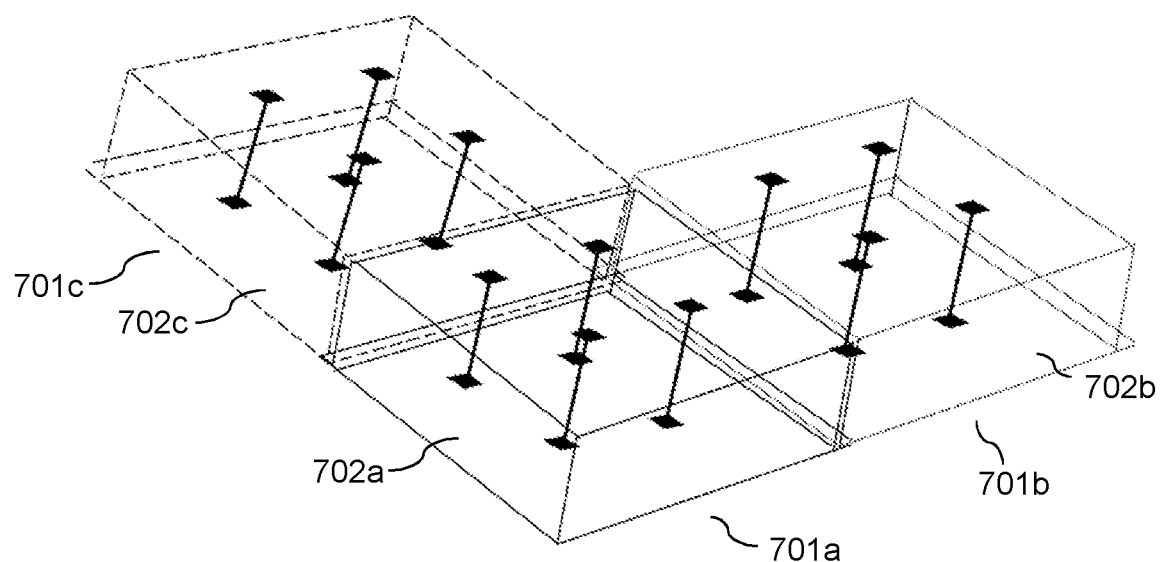

FIG. 12 shows a perspective view of the cell arrangement in the erosion prevention system of FIG. 2a, made up of cell portions 701 according to FIGS. 7a and 7b. A first cell portion 701a is shown in solid lines, a second cell portion 701b in dotted lines, and a third cell portion 701c in dashed lines. The cell portions 701a-c form part of the incline section 206 of the erosion prevention system of FIG. 2a. The second cell portion 701b is positioned adjacent the first cell portion 701a in the same row as the first cell portion 701a, while the third cell portion 701c is positioned adjacent the first cell portion 701a in the same column as the first cell portion 701a. Each cell portion 701a-c has a base panel 702a-c that extends out from two adjacent sides of the cell. The extending base panel 702a of the first cell 701a overlaps with the base panel 702b of the adjacent second cell portion 701b, the base panel 702c of the adjacent third cell portion 701c and with a diametrically positioned cell portion that is in the column of the second cell 701b and the row of the third cell 701c (this other cell portion is not shown in FIG. 5). By this arrangement, the first cell portion 701a has a first base panel 702a that defines the bottom of the first cell portion and extends across part of the bottom of the adjacent second cell portion 701b. The bottom of that adjacent second cell portion 701b is defined by that cell's own base panel 702b. Although not shown in FIG. 5, the top of the first cell is defined by a lid panel that extends over the entire column of cells containing the first cell, and thus also defines the lid of the third cell. This cross-linking arrangement of overlapping panels at both the top and bottom of the cells provides an especially robust and flexible fastening, causing the erosion prevention system to behave as a monolithic, flexible structure.

Figure 13A:
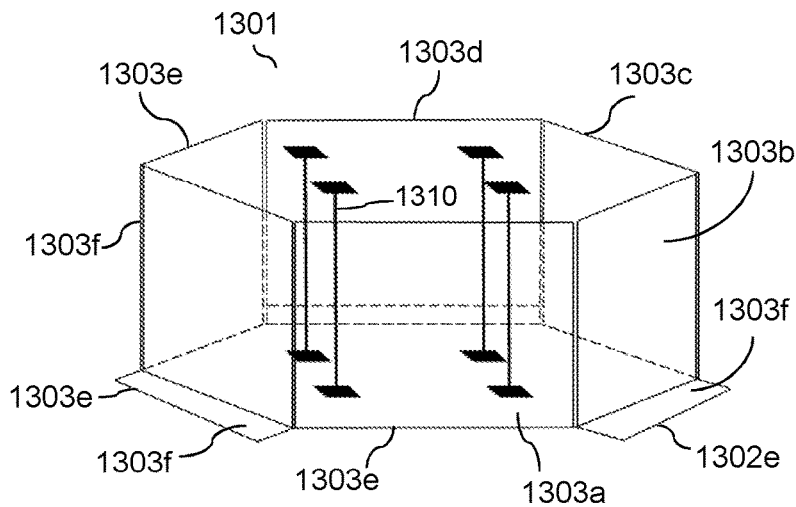
FIG. 13a shows a perspective view of a hexagonal prism shaped cell portion.
Figure 13B:
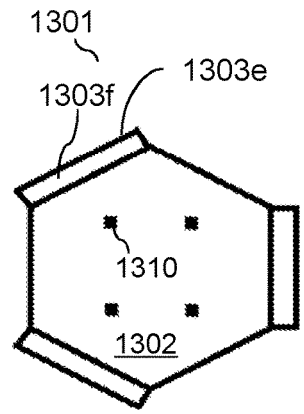

FIG. 13a shows a perspective view of a hexagonal prism shaped cell portion 1301 suitable for forming an erosion prevention system according to the invention. Structurally, the cell portion 1301 is similar to the cell portion 801 of FIG. 8a, and features corresponding to those of FIG. 8a are labelled with the same reference numerals as used in FIG. 8a, prefixed '13' rather than '8'. The cell portion 1301 has six upstanding side panels 1303a-f, three of which are inwardly spaced from the edge 1302e of the base panel 1302. The inward spaced side panels 1303b, 1303d, 1303f are sides of the cell that do not share a vertical edge. Instead, the inward spaced side panels 1303b, 1303d, 1303f are separated by side panels 1303a, 1303c, 1303e that are positioned at the edge 1302e of the base panel 1302. FIG. 13b shows a plan view of the cell portion 1301 of FIG. 13a. The plan view clearly shows the arrangement of the side panels on the base panel 1302, and the positioning of the four bracing assemblies 1310 in the cell.

Figure 14:
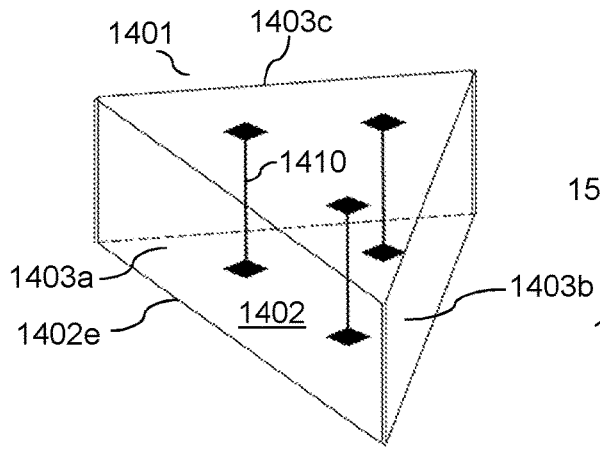
FIGS. 14 and 15a show perspective views of cropped base and extended base triangular prism shaped cell portions, respectively.
Figure 15A:
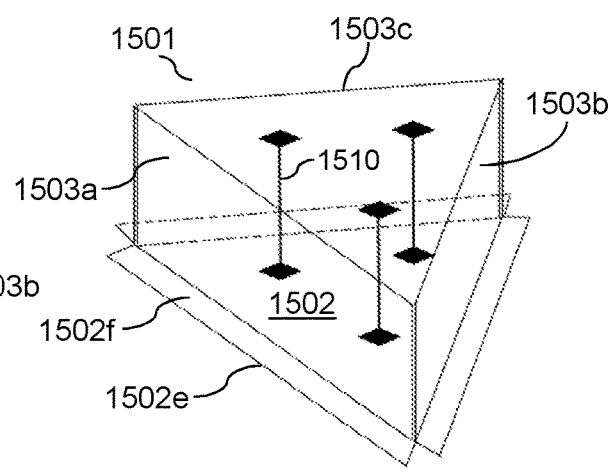
Figure 15B:
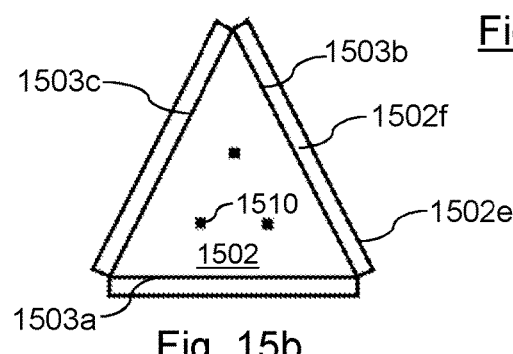

FIGS. 14 and 15a show perspective views of cropped base and extended base triangular prism shaped cell portions 1401, 1501, respectively. An erosion protection system can be formed by assembling together the extended 1501 and cropped 1401 base cell portions with each extended base cell portion 1501 surrounded by three cropped 1401 cell portions. Structurally, the cell portions 1401 and 1501 are similar to the cell portions 1101 and 901 of FIGS. 11 and 9, respectively. Features corresponding to those of cell portions 1101 and 901 in FIGS. 11 and 9 are labelled with the same reference numerals as used in FIGS. 1101, prefixed '14' and '15' rather than '11' and '9'. The cell portion 1401 has three upstanding side panels 1403a-c, all of which are positioned at the edge 1402e of the base panel 1402. The cell portion 1501 has three upstanding side panels 1503a-c, all of which are spaced inwards from the edge 1502e of the base panel 1502. The extending portions 1502f of the base panel 1502 are in the form of flaps, as for the cell portion 901 of FIG. 9. FIG. 15b shows a plan view of the cell of FIG. 15a. The plan view clearly shows the arrangement of the side panels 1503a-c on the base panel 1502, and the positioning of the three bracing assemblies 1510 in the cell.

Figure 16A:
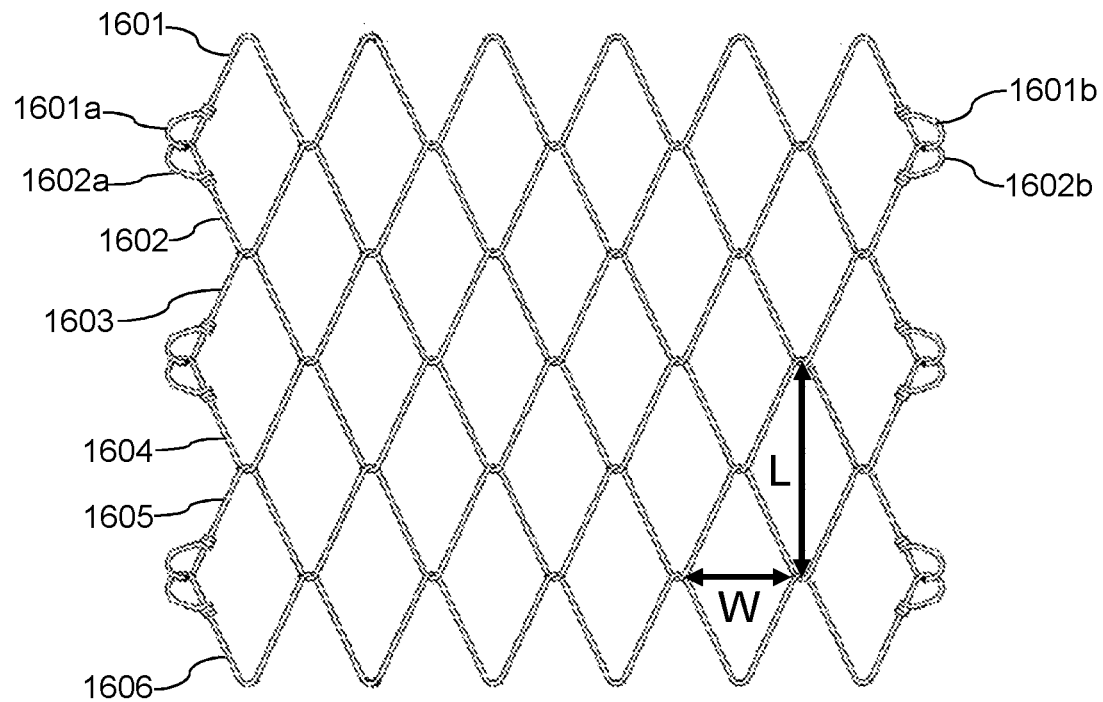
Figure 16B:

FIG. 16a shows a top plan view of a wire mesh suitable for use in the erosion prevention system of FIG. 2a. Shown in FIG. 6a is Geobrugg® TECCO® mesh. Optionally, the mesh is G65/3 STAINLESS TECCO® mesh. The mesh is a chain-link woven mesh having a diamond pattern, with each diamond opening having a length L greater than a width W. The mesh portion shown in FIG. 16a is made up of six zig-zag interlaced wires 1601-6. The cut ends of each wire 1601a, 1602b are knotted and interlinked with the knotted cut ends of the adjacent wire 1602a, 1602b. FIG. 16b shows a side view of the wire mesh of FIG. 16a.

Figure 17A:
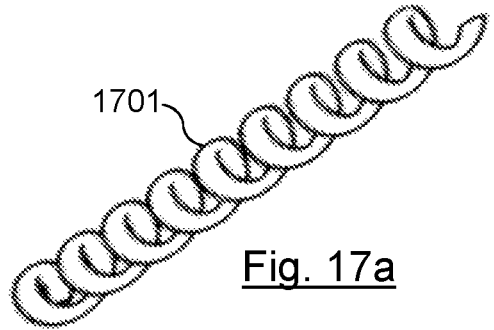
FIG. 17a shows a helicoil fastening 1701 for fastening together panels of wire mesh.
Figure 17B:
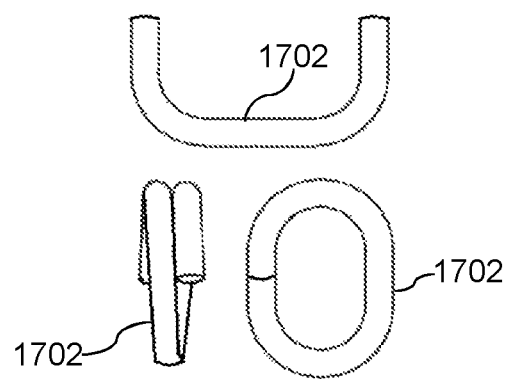
FIG. 17b shows a c-clip 1702 for fastening together panels of wire mesh.

FIG. 17a shows a helicoil fastening 1701 suitable for fastening together panels of wire mesh. In use, the helicoil fastening 1701 is wound around the wires of two adjacent mesh panels to link the panels together. FIG. 17b shows a c-clip 1702 suitable for fastening together panels of wire mesh. The c-clip is shown in two configurations—open (before being used to fasten panels together, when the clip has a 'c' shape), and closed (after being secured around a pair of adjacent wires to fasten wires together, when the clip overlaps itself to form an 'o' shape). In FIG. 17b, the clip in its close configuration is shown in plan view and side view to show the overlapping clip ends. FIG. 17c shows a spring clip 1703 suitable for fastening together panels of wire mesh. The clip shown is a T3 clip available from Geobrugg®.

Figure 18:
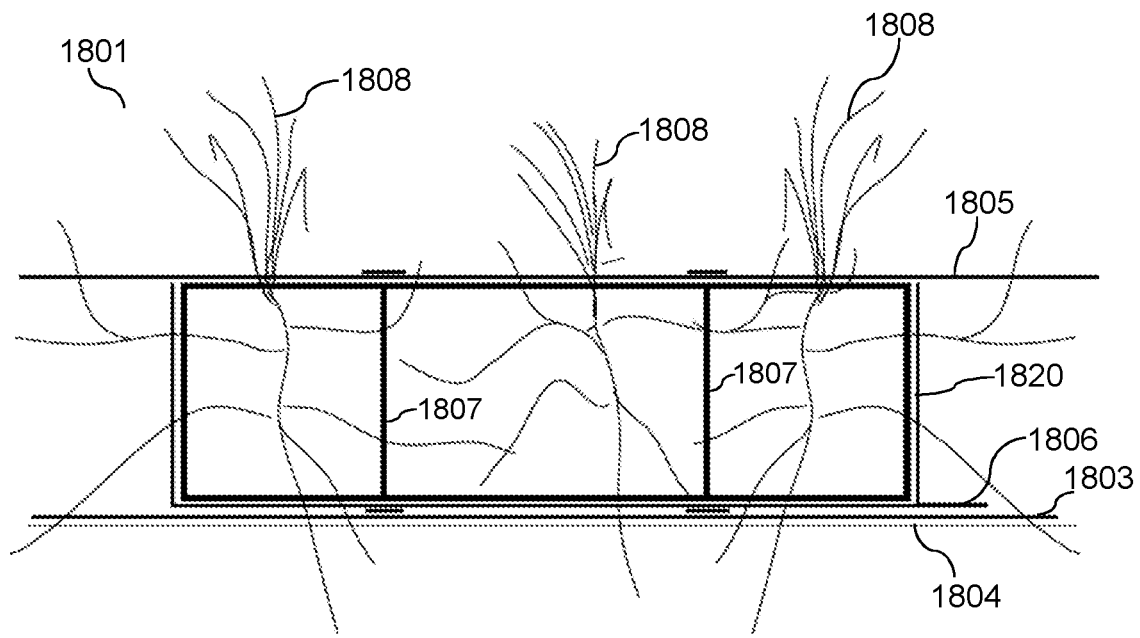
FIG. 18 shows a side cross-section view of a cell with a water permeable fines barrier.

FIG. 18 shows a side cross-section view of a cell 1801 fitted with a water permeable fines barrier 1820. The fines barrier is in the form of a bag that lines the bottom, sides and top of the cell 1801. The fines barrier bag 1820 is biodegradable, and formed from a sheep wool material, although other biodegradable materials could be used. The fines barrier bag 1820 is filled with sand, pushing the bag out against the panels defining the bottom and sides of the cell. FIG. 18 is a schematic view of a single cell 1801, shown in position in an erosion protection system for clarity. Also shown in FIG. 18 is a scour prevention layer 1803 comprising a (biodegradable or non-biodegradable) geotextile material. The scour prevention layer 1803 is optional, but may assist in avoiding undermining of the cells in the event that water tracks along the bottom of the cells below the fines barrier bags 1820. The scour prevention layer 1803 is sandwiched between the cell 1801 and the ground 1804 requiring erosion prevention. The top of the cell 1801 is defined by a lid panel 1805 that spans the top of the cell and neighbouring cells (not shown in FIG. 18). An extension of the base panel 1806 defining the bottom of the cell protrudes from at least one side to overlap below the base panel of one or more adjacent cells (not shown in FIG. 18). The cell 1801 comprises a plurality of brace assemblies 1807 that help keep the lid panel 1805 in alignment with the base panel 1806. FIG. 18 shows the cell 1801 with a number of established live plants 1808. The plants are *marram* grass plants that have grown significant root systems 1808 that extend throughout the cell, into neighbouring cells (not shown in FIG. 18), and into the ground 1804. The root system stabilises the sand filling the cell, holding it in place as the fines barrier bag 1820 naturally degrades. Over time, the *marram* grass plants 1808 stimulate formation of a sand dune system over the robust base provided by the erosion protection system.

Figure 19:
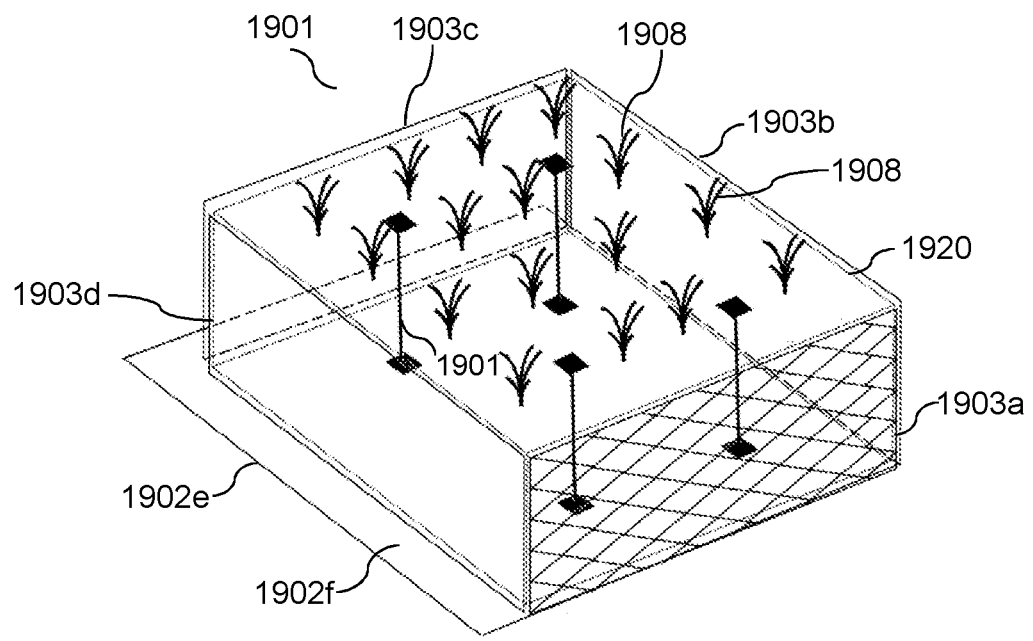
FIG. 19 shows a perspective view of another cell portion similar to that forming the bottom and sides of the cell of FIG. 18, again including a fines barrier.

FIG. 19 shows a perspective view of a cell portion 1901 similar to that forming the bottom and sides of cell 1801 of FIG. 18. The cell 1901 is made up of the cell portion 701 of FIG. 7, fitted with a fines barrier bag 1920. The features of the cell portion 1901 equivalent to those of cell portion 701 are labelled with the same reference numerals as used in FIG. 7, prefixed '19' instead of '7'. For clarity, no lid panel is shown in FIG. 19. FIG. 19 shows the position of sixteen *marram* grass plants 1908 (only the tops of the plants are shown in FIG. 19). The plants protrude through slits in the top of the fines barrier bag 1920 (not shown in FIG. 19). The fines barrier bag 1920 is filled with sand, soil, rocks or a mixture thereof. The cell portion 1901 can be arranged with other cell portions in the same way as the cell portion 701. It will be appreciated that any of the cell portions shown in preceding figures may be provided with fines barrier bags.

FIG. 20 shows a row of three cell portions 1801 of FIG. 18 arranged side by side. FIG. 20 uses the same reference numerals as used in FIG. 18. FIG. 20 more clearly shows how the base panels of cells overlap adjacent cells (at the positions marked 2090 in FIG. 20), and how the *marram* grass root system spreads through adjacent cells.

FIG. 21a shows the fines barrier bag 1820 of FIG. 18 before insertion into a cell portion, and with its top flap open. The bag 1820 comprises a bottom 1822, four upstanding sides 1823 and a top flap 1824. The top flap 1824 is larger than the top opening of the bag to allow the flap 1824 to be folded down the sides 1823 of the bag when closed. The bag 1820 is sized to fit snugly into a cell portion. Pressure of the panels of the cell keep the bag closed without the need for fastenings on the bag itself. Suitable bags are entirely made from a biodegradable material, such as sheep wool. FIG. 21b shows the bag 1820 of FIG. 21a with the top flap 1824 closed and folded down over the sides 1823. As shown in FIG. 21b, the top flap 1824 is provided with a plurality of slits 1825, through which live plants and/or plant seed can be inserted when the bag is filled and closed inside a cell.

FIG. 22a shows a perspective view of a cell assembly 2201 according to the first aspect of the invention. Cell assembly 2201 is a single cell assembly comprising a one cell. The cell assembly 2201 has a lower face 2202, two opposed side faces 2203b and 2203d, and two end faces 2203a and 2203c. The cell assembly is shown in FIG. 22a in a partially assembled state, with the top of the cell open. The upper face of the cell assembly will be formed by section 2204 of the continuous length of chain-link wire mesh sheet that also forms the lower and end faces 2202, 2203a, 2203c of the cell assembly. In the cell assembly 2201 of FIG. 22a, the continuous length of wire mesh is formed from a single sheet, but could be formed from multiple sheets joined together end to end. The two side faces 2203b and 2203d are formed from separate wire mesh panels. The wire mesh sheet panels are secured together by wire fastenings (not shown in FIG. 6a) comprising rigid helicoil fastening wires, although flexible wire or wire loop (e.g. c-clip, pressed claw clip or spring clip) fastenings could be used. FIG. 22a shows the cell assembly 2201 with the top of the cell open, i.e. with section 2204 folded back, ready for the cell to be filled with rock pieces. The wire mesh forming the cell is a diamond pattern, chain link, wire mesh, shown only on end 2203a for clarity. Other mesh shapes could be used. The diamond shaped openings of the mesh have lengths greater than their widths, forming an elongate diamond. The mesh is oriented with the length axis of the diamonds parallel the bottom of the cell.

FIG. 22b shows a plan view of the cell assembly 2201 of FIG. 22a. The plan view shows the cell assembly 2201 with section 2204 folded over to close the cell, and with four bracing assemblies 2210 in place. The sheet of wire mesh forming the bottom 2202, ends 2203a and 2203c, and the top 2204 joins to itself along the edge between the top 2204 and the end 2203a.

FIGS. 23a and 23b show another cell assembly 2301 similar to the cell assembly 2201 of FIGS. 22a and 22b, and the corresponding features are given the same reference numerals except that the prefix '23' is used in place of '22'. The cell assembly 2301 differs only in that the join between the ends of the wire mesh sheet forming the lower face 2302, end faces 2303a and top face is an overlapping join positioned on the upper face of the cell assembly when the cell is closed. As shown in FIGS. 23a and 23b, two sections of the wire mesh sheet 2304a and 2304b overlap when the top of the cell is closed to form overlapping join 2330. Such a join may be more convenient and stronger than a non-overlapping join. Join 2330 is located on the upper face of the cell assembly, but could be located on another face, or across two adjacent faces and the edge between them.

Figure 24:
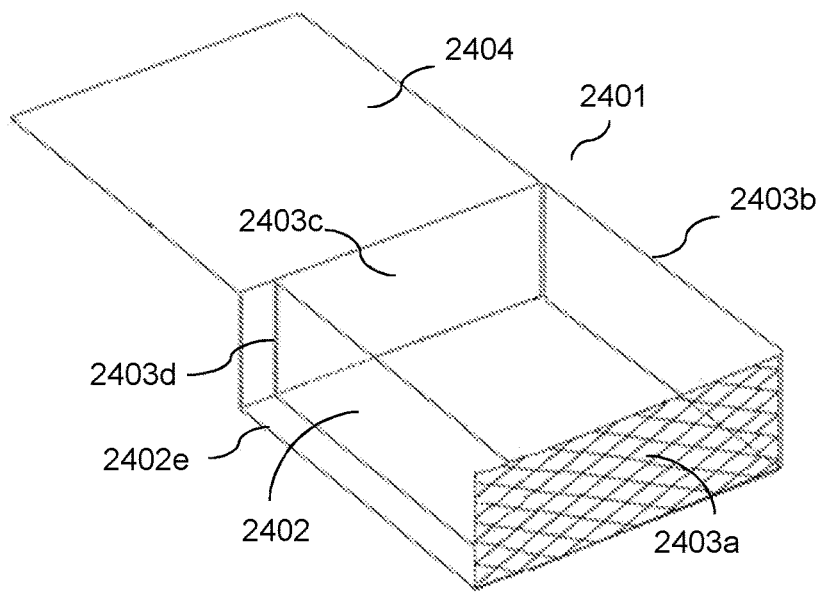
FIG. 24a shows a perspective view of another cell assembly according to the first aspect of the invention.

FIG. 24 shows another cell assembly 2401 similar to the cell assembly 2201 of FIGS. 22a and 22b, and the corresponding features are given the same reference numerals except that the prefix '24' is used in place of '22'. The cell assembly 2401 differs only in that the wire mesh side panel forming side face 2403d is spaced inwards from a side edge 2402e of the wire mesh sheet defining the lower face 2402, end faces 2403a and 2403c and upper face of the cell assembly 2401. As in FIG. 22a, the cell assembly is shown with the top of the cell open. Consequently, the wire mesh sheet extends out from a side face of the cell assembly, allowing the cell assembly 2401 to nest an adjacent cell assembly when the two are placed together side by side. When nested, the continuous length of wire mesh sheet forming the lower face 2402, end faces 2403a and 2403c and top face of the cell assembly 2401 overlap with wire mesh forming the lower face, end faces and upper face of the nested adjacent cell assembly (not shown in FIG. 24).

Figure 25:
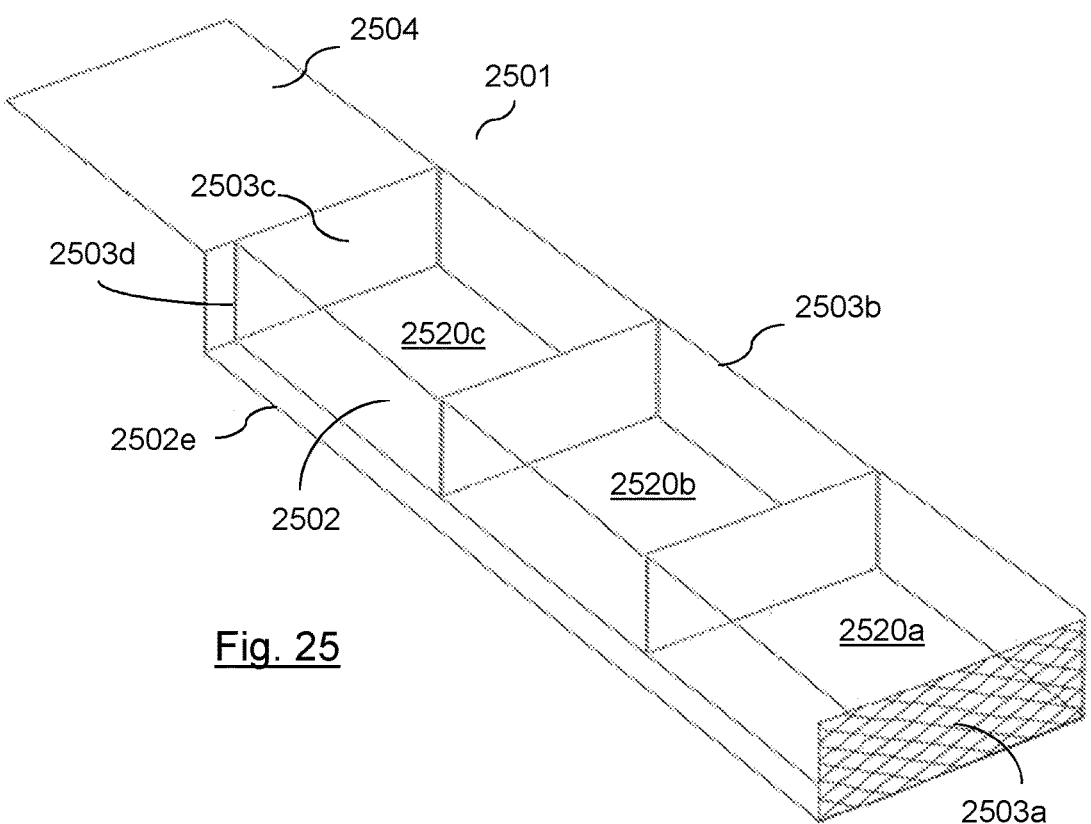
FIG. 25 shows a perspective view of another cell assembly according to the first aspect of the invention.

FIG. 25 shows another cell assembly 2501 similar to the cell assembly 2401 of FIG. 24, and the corresponding features are given the same reference numerals except that the prefix '25' is used in place of '24'. The cell assembly 2501 differs in that it comprises three cells 2520a, 2520b, 2502c. The continuous length of chain-link wire mesh that defines the lower face 2502, end faces 2503a, 2503c and upper face of the cell assembly also form the bottoms and tops of the three cells 2520a, 2520b and 2520c, and one end of each of cells 2520a, 2520c. The other ends of cells 2520a, 2520c are formed by separate chain-link wire mesh panels that also form the ends of cell 2520b that is disposed between cells 2520a, 2520c. The continuous length of chain-link wire mesh is formed from two sheets of wire mesh joined end to end on the top face of the cell assembly. FIG. 25 shows the cell assembly 2501 with the tops of the cells open and only one of those sheets of wire mesh present. To close the cells, the continuous length of wire mesh is completed by joining a second sheet to the sheet already forming the lower 2502 and end faces 2503a, 2503c of the cell assembly with overlapping joins positioned on the top face and the end face 2503a of the cell assembly 2501. It will be understood that while FIG. 25 shows the cells 2520a, 2520b, 2520c lying in the same plane, the cells could be angled relative to each other, e.g. so that cells 2520a and 2520c form toe and head sections and cell 2520b forms an inclined section. In that and other variants, the side faces of the cell assembly may be each be formed by a plurality of separate panels of wire mesh rather than a common panel of wire mesh. It will be understood that the continuous length of chain-link wire mesh could also be formed from a single sheet joined end to end by an overlapping join.

Figure 26A:
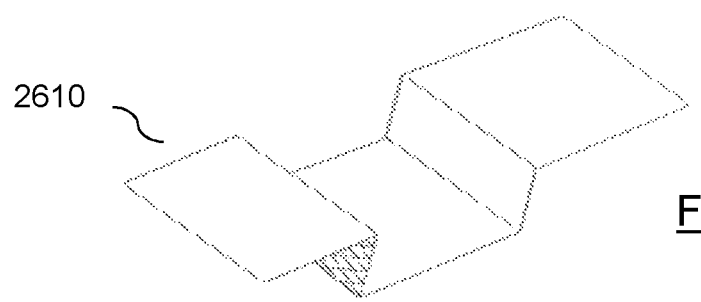
FIGS. 26a-26c show exploded and assembled perspective views of another cell assembly according to the first aspect of the invention; and, FIG. 26d shows a plan view of the cell of FIG. 26c.
Figure 26B:
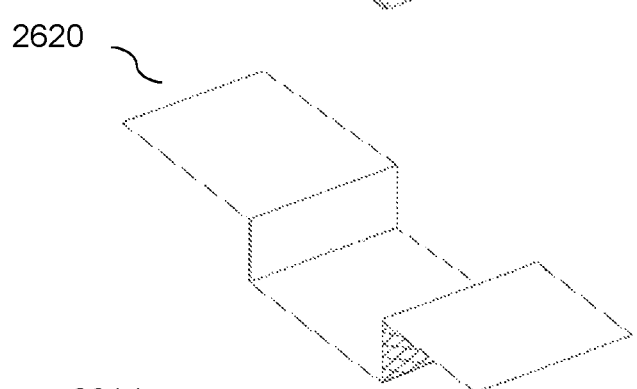
Figure 26C:
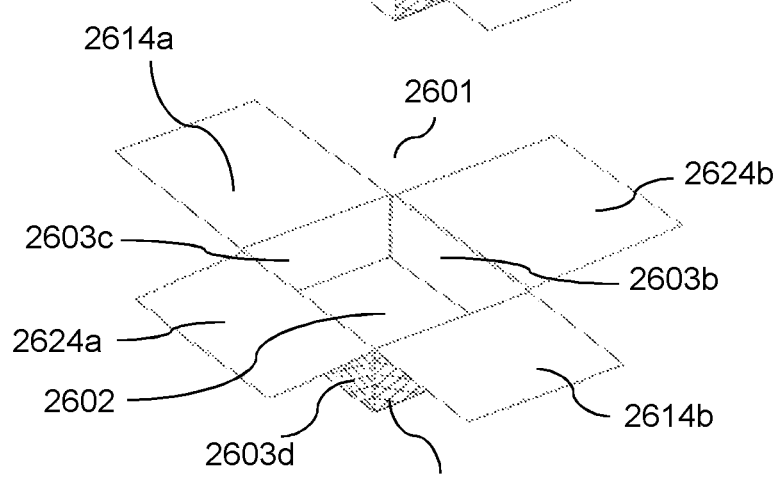
Figure 26D:
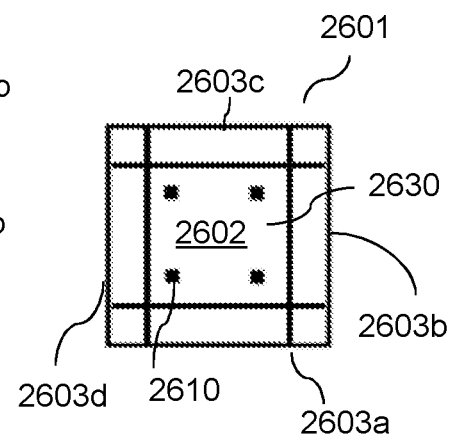

FIGS. 26a-c show exploded and assembled perspective views of another cell assembly 2601 similar to the cell assembly 2301 of FIGS. 23a and 23b, and the corresponding features are given the same reference numerals except that the prefix '26' is used in place of '23'. The cell assembly 2601 differs from cell assembly 2301 in that it is formed from two overlapping continuous sheets of wire mesh 2610, 2620, shown separately in FIGS. 26a and 26b, respectively. Once the two sheets 2610, 2620 are put together to form the cell assembly 2601, sheet 2610 wraps around the lower face 2602 and the two opposed side faces 2603b, 2603d, and sheet 2620 wraps around the lower face 2602 and the two end faces 2603a, 2603c. The cell assembly is shown in FIG. 26c in a partially assembled state, with the top of the cell open. To close the cell, the ends 2614a, 2614b of sheet 2610, and the ends 2624a, 2624b of sheet 2620 are folded in over the upper face of the cell, with the opposing ends of sheets 2610 and 2620 overlapping in the middle. It will be appreciated that sheet 2610 may be located inside sheet 2620, outside sheet 2620, or inside sheet 2620 on the lower face and outside sheet 2620 on the upper face (and vice versa). The structure of cell 2601 has a double layer of mesh across the lower face 2602, and at least a double layer across the upper face (with four layers of mesh across at least a portion of the upper surface). FIG. 26d shows the four-way overlap created when the top of the cell is closed to form overlapping join 2630, where the overlapping sheets are joined by a suitable fastening device, such as a helicoil fastener. Fastenings, e.g. helicoil fastenings, may be used between sides of the sheets at edges of the cell. The bracing assemblies 2610 are positioned to pass through the four way overlapping join 2630, strengthening the overlapping join. FIGS. 26a-d show cell 2601 with both continuous sheets overlapped on the upper face of the cell. It will be appreciated that the two sheets need not overlap on the same face. For example, overlaps between sheets could be formed on the side or end faces instead. In FIGS. 26a-d, the wire mesh forming the cell is a diamond pattern, chain link, wire mesh, shown only on end 2603a and side 2603d for clarity. Other mesh shapes could be used. The diamond shaped openings of the mesh have lengths greater than their widths, forming an elongate diamond. In FIGS. 26a-d, the meshes of both sheets 2610, 2620 are oriented with the length axis of the diamonds parallel the bottom of the cell. FIGS. 26a-d show cell 2601 with the sheets 2610, 2620 forming a double layer on the lower and upper faces of the cell. Alternative constructions include having mesh 2610 extend only across the lower and side faces (and not the upper face), and/or having mesh 2610 turned to wrap the side and end faces of the cell rather than the lower, side and upper faces.

It will be appreciated that any cell design depicted in the figures may optionally include additional features described herein, such as one or more horizontal brace assemblies for tying together opposing side/end faces, and/or a stiffening mesh, e.g. in the form of a welded reinforcement mesh panel such as A393 mesh.

Coastal erosion prevention systems are often exposed to extreme forces, causing movement of even the largest of rocks commonly used for rock armour. In conventional sea defences, such forces tend to be damaging, weakening the system over time. However, a result of the fully integrated structure of the system of the present invention is that distortions of the system increases tension in the wire mesh, strengthening the structure. This is especially true when the mesh is formed from high tensile, stainless steel wire.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

Certain aspects of the invention are described in the following numbered clauses:

Clause 1—an erosion prevention system according to claim 18 of the claims.

Clause 2: The erosion prevention system of clause 1, wherein the second cell abuts a first side of the first cell, and the third cell abuts a second side of the first cell, and wherein the first and second sides of the first cell are adjacent sides of the first cell.

Clause 3: The erosion prevention system of clause 1 or 2, wherein the base, side and lid panels of each cell are fastened together at the cell edges by one or more tie wires and/or a plurality of clips.

Clause 4: The erosion prevention system of any preceding clause, wherein the wire mesh forming the base, side and lid panels is formed from high tensile steel wire having a diameter of at least 2 mm and a tensile strength of at least 1,000 N/mm$^2$, optionally wherein the wire mesh has a tensile strength of at least 75 kN/m.

Clause 5: The erosion prevention system of clause 3 or clause 4 wherein the tie wires and/or the plurality of clips are formed from high tensile steel wire having a diameter of at least 2 mm and a tensile strength of at least 1,000 N/mm$^2$.

Clause 6: The erosion prevention system of any preceding clause, wherein the wire mesh forming the base, side and lid panels, and optionally the tie wires and/or the plurality of clips, if present, is formed from stainless steel wire, such as austenitic stainless steel wire.

Clause 7: The erosion prevention system of any preceding clause, wherein at least one of the at least three side panels of each cell is spaced inwards from a peripheral edge of the base panel defining the bottom of said cell by at least 150 mm; wherein the base panel defining the bottom of the first cell extends below and overlaps the base panel defining the bottom of the adjacent second cell by at least 150 mm.

Clause 8: The erosion prevention system of clause 7, wherein each cell has at least four upstanding sides, wherein at least two of the side panels of each cell are spaced inwards from the peripheral edge of the base panel defining the bottom of said cell by at least 150 mm, wherein the base panel defining the bottom of the first cell: extends below and overlaps the base panel defining the bottom of the adjacent second cell by at least 150 mm; and extends below and overlaps a base panel defining the bottom of a further cell by at least 150 mm, the further cell being adjacent the first cell and different to the second cell, optionally wherein the further cell is the third cell.

Clause 9: The erosion prevention system of any of clauses 1-6, wherein the plurality of cells comprises a plurality of first extended base cells and a plurality of second cropped base cells, wherein all said side panels of each extended base cell are spaced inwards from a peripheral edge of the base panel defining the bottom of said extended base cell by at least 150 mm; wherein all said side panels of each cropped base cell are positioned at a peripheral edge of the base panel defining the bottom of said cropped base cell; wherein each side of the extended base cells abutting another cell abuts a side of a cropped base cell and each side of the cropped base cells abutting another cell abuts a side of an extended base cell; and wherein the extended base panel of each extended base cell extends below and overlaps the base panels defining the bases of adjacent cropped base cells by at least 150 mm.

Clause 10: The erosion prevention system of any one of clauses 1-8, wherein the first base panel extends across at least a portion of the bottom of one or more cells different to the first and second cells, optionally wherein the first base panel defines the bottom of the second cell and optionally defines the bottom of one or more cells different to the first and second cells.

Clause 11: The erosion prevention system of any preceding clause, wherein the first lid panel extends across at least a portion of the top of one or more cells different to the first and third cells.

Clause 12: The erosion prevention system of any preceding clause, wherein each cell comprises at least one brace assembly tying the base panel defining the bottom of the cell to the lid panel defining the top of the cell, for example wherein each brace assembly comprises a lower brace plate disposed below said base panel, an upper brace plate disposed above said lid panel, and a tensioning cable joining the lower brace plate to the upper brace plate.

Clause 13: The erosion prevention system of any preceding clause, wherein each cell is filled with rock pieces, such as rock pieces having a cross-sectional size in all dimensions larger than the cross-sectional size of the wire mesh openings.

Clause 14: The erosion prevention system of any preceding clause, wherein each cell comprises a water permeable fines barrier for preventing passage of granular material therethrough, the fines barrier being disposed below the lid panel of each cell, optionally wherein the fines barrier lines the top of said cell adjacent the lid panel.

Clause 15: The erosion prevention system of clause 14, wherein the fines barrier lines the at least three sides of said cell adjacent the side panels, and optionally the bottom of said cell adjacent the bottom panel, optionally wherein the fines barrier is in the form of a bag having a bottom lining the bottom of said cell, sides lining the at least three sides of said cell, and a top flap lining the top of said cell.

Clause 16: The erosion prevention system of clause 14 or clause 15, wherein the fines barrier is formed from a biodegradable material, optionally wherein the biodegradable material is one or more of sheep wool, or coconut fibre based material.

Clause 17: The erosion prevention system of any one of clauses 14-16, wherein each cell contains granular material such as sand and/or soil, and optionally rock pieces, such as rock pieces having a cross-sectional size in all dimensions larger than the cross-sectional size of the wire mesh openings; wherein the granular material is disposed below, or located in a space enclosed by the fines barrier.

Clause 18: The erosion prevention system of any one of claims 14-17, wherein each cell comprises a plurality of live plants, such as live grass plants, and/or plant seed, such as grass seed, wherein the plurality of live plants have roots disposed at least partially below, or at least partially located in a space enclosed by, the fines barrier, and/or the plant seed is disposed below, or located in a space enclosed by, the fines barrier.

Clause 19: An erosion prevention system according to any preceding clause, comprising a toe section and an incline section, wherein the toe section comprises at least one upper row of cells stacked above at least one lower row of cells, and the incline section comprises at least a first row of cells and optionally at least a second row of cells arranged alongside the first row of cells, optionally wherein the erosion prevention system is configured for installation on a slope so that, when installed on the slope, the stacked rows of cells forming the toe section extend across the base and/or a lower part of the slope, and each row of cells forming the inclined section extends across the slope above the toe section, optionally wherein each cell in the upper row of the toe section is secured to at least one cell in the incline section by a lid panel or a base panel, wherein each cell in the toe section is secured to another cell in the same row of the toe section by a base panel or a lid panel, and wherein each cell in the incline section is secured 1) to another cell in the same row of the incline section by a base panel or a lid panel, and 2) to another cell in a different row of the incline section and/or to another cell in the upper row of the toe section by a lid panel or a base panel.

Clause 20: A cell portion for an erosion prevention system, comprising at least three side panels upstanding from a base panel, the side panels and the base panel each being formed from wire mesh and fastened together at cell edges, wherein at least one of the side panels is spaced inwards from a peripheral edge of the base panel by at least 150 mm so that the base panel extends at least 150 mm beyond at least one side of the cell portion.

Clause 21: The cell portion according to clause 20, comprising at least four side panels upstanding form the base panel, wherein at least two of the side panels are spaced inwards from the peripheral edge of the base panel by at least 150 mm so that the base panel extends at least 150 mm beyond at least two sides of the cell portion. Clause 22: The cell portion according to clause 20 or 21, wherein each side panel is spaced inwards from the peripheral edge of the base panel by at least 150 mm so that the base panel extends at least 150 mm beyond each side of the cell portion. Clause 23: The cell portion according to any of clauses 20-22, wherein the base and side panels are fastened together at the cell edges by one or more tie wires and/or a plurality of clips.

Clause 24: The cell portion according to any one of clauses 20-23, wherein the wire mesh is formed from high tensile steel wire having a diameter of at least 2 mm and a tensile strength of at least 1,000 N/mm², optionally wherein the wire mesh has a tensile strength of at least 75 kN/m, optionally wherein the tie wires and/or the plurality of clips, if present, are formed from high tensile steel wire having a diameter of at least 2 mm and a tensile strength of at least 1,000 N/mm². Clause 25: The cell portion according to any one of clauses 20-24, wherein the wire mesh is formed from stainless steel wire, such as austenitic stainless steel wire, optionally wherein the tie wires and/or the plurality of clips, if present, is formed from stainless steel wire, such as austenitic stainless steel wire. Clause 26: The cell portion according to any one of clauses 20-25, wherein the cell portion is suitable for forming at least some cells of the erosion prevention system of any one of clauses 1-19.

Clause 27. A kit of parts for forming the cell portion according to any one of clauses 20-26, wherein the kit of parts comprises a base panel and at least three side panels of wire mesh configured to define the bottom and sides of the cell portion, and a plurality of fastenings for fastening together the base panel and the side panels.

Clause 28: A kit of parts according to claim 19 of the claims, optionally wherein the kit of parts comprises the kit of parts of clause 27. Clause 29: The kit of parts according to clause 28, comprising a plurality of brace assemblies for tying the base panel to the lid panel of each cell, optionally wherein each brace assembly comprises a lower brace plate configured for disposal below said base panel, an upper brace plate configured for disposal above said lid panel, and a tensioning cable for joining the lower brace plate to the upper brace plate, and optionally a one-way clip for holding the upper brace plate in position on the cable.

Clause 30: The kit of parts according to clause 28 or 29, comprising a plurality of water permeable fines barriers for preventing passage of sand therethrough, each fines barrier being sized and configured for disposal inside one of said cells below the lid panel when assembled, optionally wherein each said fines barrier is sized and configured to line the top of the cell adjacent the lid panel when assembled.

Clause 31: The kit of parts according to clause 30, wherein each said fines barrier is sized and configured to line the at least three sides the said cell adjacent the side panels, and optionally the bottom of the cell adjacent the bottom panel, optionally wherein the fines barrier is in the form of a bag having a bottom for lining the bottom of said cell, sides for lining the at least three sides of said cell, and a top flap for lining the top of said cell. Clause 32: The kit of parts according to clause 30 or 31, wherein each fines barrier is formed from a biodegradable material, optionally wherein the biodegradable material is one or more of sheep wool, or coconut fibre based material. Clause 33: The kit of parts according to any one of clauses 30-32, comprising plurality of live plants, such as live grass plants, and/or plant seed, such as grass seed.

Clause 34: The kit of parts according to any one of clauses 28-33, comprising scour prevention layer for disposal below the cells.

Clause 35: A method according to claim 20 of the claims. Clause 36: The method according to clause 35, comprising installing at least part of one or more bracing assemblies into each cell potion before the step of inserting fill material into the cell portions, and completing the bracing assemblies after the step of closing the plurality of cell portions to tie the base panel to the lid panel of each cell. Clause 37: The method of clause 35 or 36, comprising inserting into each cell portion a water permeable fines barrier for preventing passage of sand and/or soil therethrough, either immediately before, during, or immediately after the step of inserting fill material into said cell. Clause 38: The method of clause 37, wherein each fines barrier is in the form of a bag, wherein the method comprises inserting each fines barrier into a cell portion before the step of inserting fill material, arranging the bag so that the bottom and sides of the bag line the bottom and sides of the cell portion, filling each bag with fill material thereby inserting fill material into the cell portions, and closing the top flap of the bag over the fill material before the step of closing the plurality of cell portions.

Clause 39: The method of clause 37 or 38, comprising 1) adding plant seed to the fill material; and/or 2) inserting the roots of a plurality of live plants, such as live grass plants, and/or plant seed, such as grass seed, through openings in the top of the fines barrier before or after the step of closing the plurality of cell portions.

The invention claimed is:

1. A cell assembly for an erosion prevention system, the cell assembly having opposed upper and lower faces, opposed first and second end faces and opposed first and second side faces;
    wherein the cell assembly comprises a plurality of cells for containment of rock pieces, each cell having a bottom, first and second opposed upstanding sides, first and second opposed upstanding ends and a top each formed from chain-link wire mesh;
    wherein a continuous length of chain-link wire mesh wraps around and defines the opposed upper and lower faces and the opposed end faces of the cell assembly, the continuous length of wire mesh being a single continuous sheet of chain-link wire mesh having a first end and a second end overlapped and fastened together to form an overlapping join positioned on the upper, first end and/or second end face of the cell assembly,
    and wherein the continuous length of chain-link wire mesh extends beyond at least one side face of the cell assembly, thereby being configured to overlap at least a portion of a lower face, an upper face, a first end face and a second end face of a corresponding second cell assembly when the cell assembly is positioned adjacent to said second cell assembly.

2. The cell assembly according to claim 1, wherein:
    the overlap of the overlapping join is at least 150 mm, and/or wherein each overlap is at least two rows of mesh openings,
    and the continuous length of chain-link wire mesh extends beyond at least one side face of the cell assembly by at least 250 mm.

3. The cell assembly according to claim 1, wherein:
    at least one side of each of the plurality of cells is defined by a chain-link wire mesh side panel that defines a side of an adjacent cell;
    wherein at least one end of each of the plurality of cells is defined by a chain-link wire mesh end panel that defines an end of an adjacent cell; and
    wherein the continuous length of chain-link wire mesh forms at least the bottom and top of each cell.

4. The cell assembly according to claim 1, wherein at least one side face of the cell assembly is defined by a second continuous length of chain-link wire mesh that at least partially wraps around an adjacent face of the cell assembly, wherein at least a portion of the second continuous length is overlapped by or overlaps a portion of the continuous length of wire mesh defining the bottom, first and second ends and top of the cell assembly,
    optionally wherein the first and second opposed side faces are both defined by the second continuous length of chain-link wire mesh, and wherein opposed ends of the second continuous length are joined end to end.

5. The cell assembly according to claim 1, comprising a strengthening grid positioned inside one or more cells, the strengthening grid being a welded wire mesh formed from stainless steel rods each having a diameter of at least 8 mm, wherein the strengthening grid extends across at least 75% of a first internal width and across at least at least 75% of a second internal width of the cell, wherein the first internal width is the distance between opposed ends, and the second internal width is the distance between opposed sides, of the cell.

6. The cell assembly according to claim 1,
wherein the wire mesh is formed from high tensile stainless steel wire having a diameter of at least 2 mm and a tensile strength of at least 1,000 N/mm$^2$;
wherein sheets and/or panels of wire mesh are fastened together with a tie wires and/or a plurality of clips, wherein the tie wires and/or the plurality of clips are formed from high tensile stainless steel wire having a diameter of at least 2 mm and a tensile strength of at least 1,000 N/mm$^2$.

7. The cell assembly according to claim 1, wherein the sheet of chain-link wire mesh forming the continuous length of chain-link wire mesh is formed from interlaced wires extending from one side edge to an opposed side edge in a direction parallel to the opposed end edges, and wherein wire ends are knotted into loops that interlock with a corresponding loop on the end of an adjacent wire.

8. The cell assembly according to claim 1, wherein each cell comprises:
at least one vertical brace assembly tying the wire mesh forming the bottom of the cell to the wire mesh forming the top of the cell, wherein each vertical brace assembly comprises a lower brace plate disposed below the wire mesh of the bottom of the cell, an upper brace plate disposed above the wire mesh of the top, and a tensioning cable joining the lower brace plate to the upper brace plate, and/or
at least one horizontal brace assembly tying the wire mesh forming a side or end of the cell to the wire mesh forming the opposing side or end of the cell, wherein each horizontal brace assembly comprises a first brace plate disposed outside the wire mesh of the side cell, a second brace plate disposed outside the wire mesh of the opposed side, and a tensioning cable joining the first brace plate to the second brace plate.

9. The cell assembly according to claim 1, wherein each cell is filled with rock pieces having a cross-sectional size in all dimensions larger than the cross-sectional size of the wire mesh openings.

10. The cell assembly according to claim 1, wherein each cell comprises a water permeable fines barrier for preventing passage of granular material therethrough, the fines barrier being disposed below the wire mesh forming the top of the cell, optionally wherein the fines barrier lines the top of said cell adjacent to the wire mesh forming the top,
wherein the fines barrier is formed from a biodegradable material, such as sheep wool, or coconut fiber based material,
optionally wherein the fines barrier lines the sides and end of the cell adjacent the wire mesh forming the sides and end, and optionally the bottom of the cell adjacent the wire mesh forming the bottom,
optionally wherein the fines barrier is in the form of a bag having a bottom lining the bottom of the cell, sides lining the sides and end of the cell, and a top flap lining the top of the cell.

11. The cell assembly of claim 10, wherein each cell contains granular material such as sand and/or soil, and optionally rock pieces having a cross-sectional size in all dimensions larger than the cross-sectional size of the wire mesh openings;
wherein the granular material is disposed below the fines barrier, or located in a space enclosed by the fines barrier,
optionally wherein each cell comprises a plurality of live plants, such as live grass plants, and/or plant seed, such as grass seed, wherein the plurality of live plants have roots disposed at least partially below, or at least partially located in a space enclosed by, the fines barrier, and/or the plant seed is disposed below, or located in a space enclosed by, the fines barrier.

12. An erosion prevention system comprising a plurality of cell according to claim 1, wherein the continuous length of chain-link wire mesh defining the lower, first and second end and upper faces of each cell assembly overlaps or is overlapped by another continuous length of chain-link wire mesh wire mesh defining lower, first and second end and upper faces of an adjacent second cell assembly.

13. A kit of parts for forming the cell assembly according to claim 1, the kit of parts comprising:
a chain-link wire mesh sheet for forming the continuous length of chain-link wire mesh defining the lower, first and second end and upper faces of the cell assembly,
a plurality of wire mesh panels for forming the first and second side faces of the cell assembly and for defining a side/end of one or more cells of the cell assembly,
fastenings for securing together the ends of the wire mesh sheet to form the overlapping join, and for fastening the wire mesh panels to the sheet, and
a plurality of vertical and/or horizontal brace assemblies for tying the wire mesh defining the bottom to the wire mesh defining the top of the cell assembly and/or the wire mesh defining the first side/end to the wire mesh defining the second side/end,
wherein each brace assembly comprises a lower/first brace plate, an upper/second brace plate, and a tensioning cable for joining the lower/first brace plate to the upper/second brace plate, and optionally a one-way clip for holding the upper/second brace plate in position on the cable.

14. A kit of parts according to claim 13, comprising a plurality of water permeable fines barriers for preventing passage of sand therethrough, each fines barrier being sized and configured for disposal inside each cell, wherein each fines barrier is formed from a biodegradable material.

15. A method of constructing an erosion prevention system, the method comprising:
assembling a plurality of cell assemblies according to claim 1;
wherein assembling each cell assembly comprises fastening the continuous length of chain-link wire mesh for defining the lower, first and second end and upper faces of the cell assembly to a plurality of wire mesh panels for defining the first and second side faces of the cell assembly and a side/end of one or more cells of the cell assembly; and
wherein each cell has an open top;
securing the cell assemblies together so that the continuous length of chain-link wire mesh defining the lower faces of each cell assembly overlaps and/or is overlapped by the continuous length of chain-link wire mesh defining the lower face of an adjacent cell assembly;

inserting fill material into each cell; and securing the continuous length of chain-link wire mesh across the upper face of the cell assembly by fastening together the ends of the continuous length of chain-link wire mesh, and fastening the continuous length of chain-link wire mesh to said wire mesh panels, thereby closing each cell so that the continuous length of chain-link wire mesh defining the first and second end and upper faces of each cell assembly overlaps and/or is overlapped by the continuous length of chain-link wire mesh defining the first and second end and upper faces of the adjacent cell assembly;

wherein the step of securing the cell assemblies together is performed before, during or after the step of inserting fill material into each cell of the cell assembly.

16. The method according to claim 15, comprising installing at least part of one or more bracing assemblies into each cell before the step of inserting fill material into the cells, and completing the bracing assemblies after the step of closing the cells to tie the wire mesh defining the bottom to the wire mesh defining the top of each cell.

17. The method according to claim 15, comprising inserting into each cell a water permeable fines barrier for preventing passage of sand and/or soil therethrough, either immediately before, during, or immediately after the step of inserting fill material into said cell;

wherein each fines barrier is in the form of a bag;

wherein the method comprises inserting each fines barrier into a cell before the step of inserting fill material, arranging the bag so that the bottom and sides of the bag line the bottom and sides of the cell, filling each bag with fill material thereby inserting fill material into the cells, and closing the top flap of the bag over the fill material before the step of closing the cells.

* * * * *